(12) United States Patent
Tateno

(10) Patent No.: US 8,520,931 B2
(45) Date of Patent: Aug. 27, 2013

(54) POSITION AND ORIENTATION MEASUREMENT APPARATUS AND METHOD THEREOF

(75) Inventor: Keisuke Tateno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 718 days.

(21) Appl. No.: 12/563,670

(22) Filed: Sep. 21, 2009

(65) Prior Publication Data

US 2010/0086218 A1 Apr. 8, 2010

(30) Foreign Application Priority Data

Sep. 24, 2008 (JP) ................................ 2008-244945

(51) Int. Cl.
*G06K 9/00* (2006.01)
(52) U.S. Cl.
USPC ............................ 382/154; 382/101; 382/181
(58) Field of Classification Search
USPC ................................................. 382/181, 101
See application file for complete search history.

(56) References Cited

U.S. PATENT DOCUMENTS

| 6,330,356 | B1 * | 12/2001 | Sundareswaran et al. .... 382/154 |
| 6,362,875 | B1 * | 3/2002 | Burkley .................... 356/139.03 |
| 2004/0175039 | A1 * | 9/2004 | Miller ........................... 382/181 |
| 2006/0265442 | A1 * | 11/2006 | Palayur ........................ 708/200 |
| 2007/0182739 | A1 | 8/2007 | Platonov |
| 2008/0031490 | A1 * | 2/2008 | Kobayashi .................... 382/101 |

FOREIGN PATENT DOCUMENTS

| JP | 07-103715 A | 4/1995 |
| JP | 08-114416 A | 5/1996 |
| JP | 10-111934 A | 4/1998 |
| JP | 10-162147 A | 6/1998 |
| JP | 2000-194863 A | 7/2000 |
| JP | 2001-143073 A | 5/2001 |
| JP | 2002-032743 A | 1/2002 |
| JP | 2005-322002 A | 11/2005 |
| JP | 2007-207251 A | 8/2007 |

OTHER PUBLICATIONS

T. Drummond and R. Cipolla, "Real-time visual tracking of complex structures," IEEE Transactions on Pattern Analysis and Machine Intelligence, vol. 24, No. 7, pp. 932-946, 2002.
L. Vacchetti, V. Lepetit, and P. Fua, "Combining edge and texture information for real-time accurate 3D camera tracking," Proc. The 3rd IEEE/ACM International Symposium on Mixed and Augmented Reality (ISMAR04), pp. 48-57, 2004.

(Continued)

*Primary Examiner* — Hadi Akhavannik
(74) *Attorney, Agent, or Firm* — Canon U.S.A., Inc., IP Division

(57) ABSTRACT

A position and orientation measurement apparatus extracts a plurality of geometric feature based on geometric information of an observation object by drawing three-dimensional model data which represents a surface shape of the observation object. Further, the position and orientation measurement apparatus searches an image feature corresponding to the plurality of geometric feature in a reference image in which a position and orientation of an imaging apparatus relative to the observation object has been calculated and selects the geometric feature whose corresponding image feature is detected from the plurality of extracted geometric features. The position and orientation measurement apparatus calculates the position and orientation of the imaging apparatus relative to the observation object by associating the selected geometric feature with an image of the observation object in an input image.

14 Claims, 19 Drawing Sheets

(56) References Cited

OTHER PUBLICATIONS

E. Rosten and T. Drummond, "Fusing points and lines for high performance tracking," Proc. The 10th IEEE International Conference on Computer Vision (ICCV'05), pp. 1508-1515, 2005.

H. Wuest, F. Vial, and D. Stricker, "Adaptive line tracking with multiple hypotheses for augmented reality," Proc. The Fourth Int'l Symp. on Mixed and Augmented Reality (ISMAR05), pp. 62-69, 2005.

G. Bleser, H. Wuest, D. Stricker, "Online camera pose estimation in partially known and dynamic scenes," Proc. The 5th IEEE/ACM International Symposium on Mixed and Augmented Reality (ISMAR06), pp. 56-65, 2006.

G. Reitmayr and T. W. Drummond, "Going out: robust model-based tracking for outdoor augmented reality," Proc. The 5th IEEE/ACM International Symposium on Mixed and Augmented Reality (ISMAR06), pp. 109-118 2006.

E. Eade and T. Drummond, "Edge landmarks in monocular SLAM," Proc. BMVC06, pp. 7-16, 2006.

Kiyohide Satoh, Shinji Uchiyama, Hiroyuki Yamamoto, and Hideyuki Tamura"Robust Vision-Based Registration Utilizing Bird's-Eye View with User's View" Symposium on Mixed and Augmented Reality Proceedings of the 2nd IEEE/ACM International Symposium on Mixed and Augmented Reality ,2003.

Iryna Skrypnyk, David G. Lowe "Scene Modelling, Recognition and Tracking with Invariant Image Features"Proceedings of the 3rd IEEE/ACM International Symposium on Mixed and Augmented Reality, 2004.

\* cited by examiner

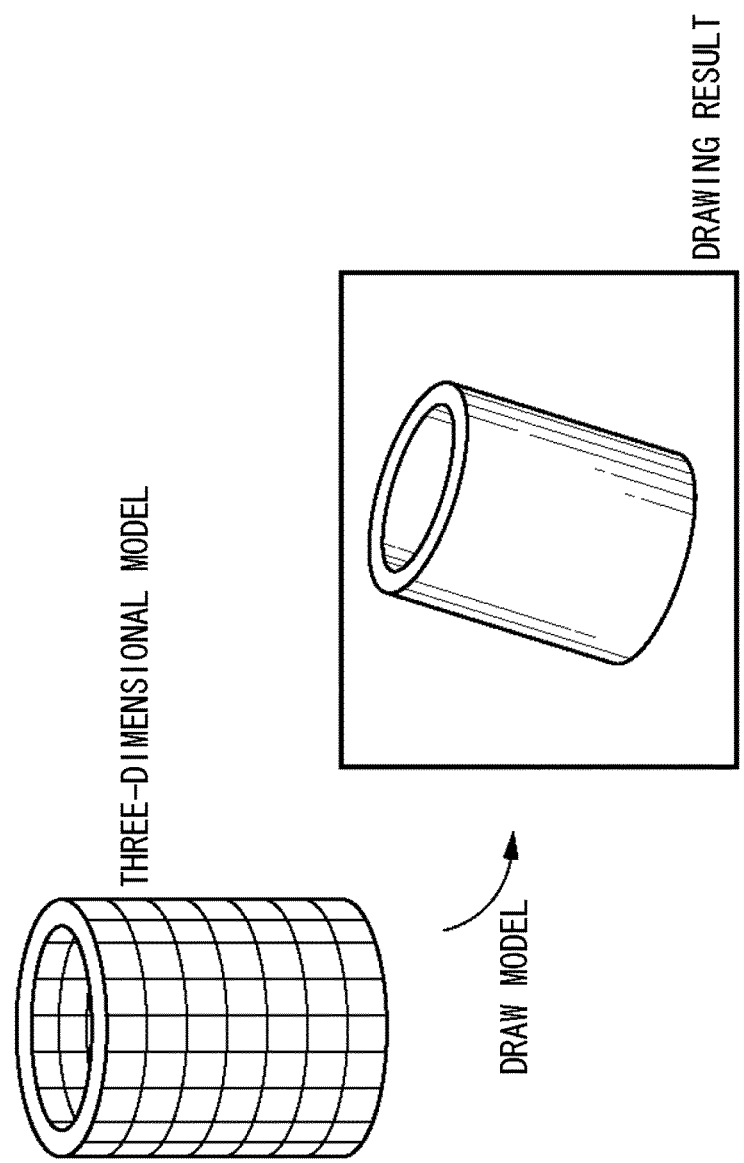

POSITION AND ORIENTATION MEASUREMENT APPARATUS AND METHOD THEREOF

BACKGROUND OF THE INVENTION

1. Field of the Invention

The present invention relates to a position and orientation measurement apparatus and method thereof which measure a position and orientation of an imaging apparatus relative to an observation object, the measurement using an image of the observation object captured by the imaging apparatus and three-dimensional model data which represents a surface shape of the observation object.

2. Description of the Related Art

A conventional technique has been discussed in which a relative position and orientation of an imaging apparatus which captures the observation object relative to an observation object is measured by the imaging apparatus such as a camera which captures a real space. Such a position and orientation measurement technique is considerably beneficial for a mixed reality system which integrates and displays the real space and a virtual space, and also for measurement of the position and orientation of a robot.

There is known a method for acquiring the position and orientation of the imaging apparatus based on a corresponding relationship between an edge in an image and the three-dimensional model of the observation object. A region where luminance observed via the observation object captured into a captured image discontinuously changes is referred to as an edge. Since the edge never changes with respect to a scale or an observation direction, positioning using the edge can be characterized by high accuracy thereof. The positioning using the edge discussed in Literature 1 (formal citation provided below) can be implemented by processing (1) to (3).

(1) The three-dimensional line segment model is projected onto the image based on the position and orientation of the camera of a previous frame and a specific parameter of the camera which has been previously corrected.

(2) Each projected line segment is divided at a constant space on the image, and dividing points are set. The edge is searched on the line segment (also referred to as a "searching line") which passes the dividing point and is oriented in a direction of a normal line of the projected line segment. A point which has an extreme slope of a luminance value on the searching line and is closest to the dividing point is detected as a corresponding edge.

(3) Correction values of the position and orientation of the camera are calculated to acquire a smallest sum of distance on the image between the corresponding edge detected at each division point and the projected line segment. The position and orientation of the camera is corrected with the correction values.

In positioning using the edge, the edge in the three-dimensional line segment model may not be detected from the captured image. If many edges which cannot be recognized as the three-dimensional line segment model are detected from the captured image, wrong points can be detected as the corresponding points, thus resulting in erroneous correspondence. The erroneous correspondence can cause a local solution in which a calculation for optimizing the position and orientation is repeated and never converges. Thus, the accuracy of the position and orientation of the imaging apparatus may be deteriorated.

Addressing the problem, Literature 2 (formal citation provided below) discusses a method for using an M estimation. More specifically, to minimize a sum of weighing errors, Literature 2 puts less weight on data in which the distance between the corresponding point and the line segment is long and more weight on data in which the distance is short. Thus, an effect of the erroneous correspondence can be eliminated.

Literature 4 (formal citation provided below) improves accuracy of correspondence between the three-dimensional line segment model and the edge in the captured image by holding information about an appearance of a periphery of the line segment on the image. The information about an appearance of the edge corresponding to the three-dimensional line segment model in the captured image is updated as needed to eliminate the effect of the erroneous correspondence caused by a change of illumination or a change of a viewing location.

Furthermore, according to Literature 3 (formal citation provided below), to help prevent erroneous positioning using the edge, in addition to the information about the three-dimensional line segment model, information about a feature of a point extracted from the captured observation object is also used in the captured image.

The position and orientation of the camera of a current frame is calculated by repeating an operation based on the correspondence between point features extracted from the captured images of frames, and the calculated position and orientation is integrated with a result of positioning of the edge to improve stability for estimating the position and orientation.

In positioning using the edge, it is required to include the three-dimensional line segment model of the observation object described by a set of the three-dimensional line segments. According to Literatures 1, 2, 3, and 4, the three-dimensional line segment model of the observation object is manually generated by using an actual observation object.

However, selecting and manually generating the three-dimensional edge which is to be observed from the actual observation object are comparatively complicated and highly time consuming. Furthermore, the edge based on a contour formed by a curved surface is hard to be described as the off-line three-dimensional line segment model.

In contrast, Japanese Patent Application Laid-Open No. 2007-207251 discusses a method for estimating the position and orientation with the edge by generating the three-dimensional line segment model from the three-dimensional model data which represents a shape of the observation object such as a computer-aided design (CAD) model. According to this method, to generate the three-dimensional line segment model, the three-dimensional model is previously drawn and the edge based on geometric information about the three-dimensional model data is detected from the drawing result.

Further, to generate a three-dimensional line segment model, Literature 5 (formal citation provided below) previously draws the three-dimensional model data of the observation object and extracts the edge based on the geometric information from a value of depth of the viewing location at which the image is drawn. According to the methods described above, the three-dimensional model of the observation object is previously drawn and the edge is extracted from the drawn image to generate the three-dimensional line segment model of the observation object. Therefore, a labor for manually generating the three-dimensional line segment model of the observation object can be decreased.

However, there is a problem in which the method described above cannot be applied for such a case where a previously-drawn appearance of the observation object and an on-line appearance thereof are not always the same, for example, where an object having a curved surface is viewed from various directions. Addressing the problem, Literature 6 (formal citation provided below) discusses a method for estimating the position and orientation by drawing on-line the three-dimensional model in which texture is set and by generating the three-dimensional line segment model from the drawn image as needed.

According to this method, the three-dimensional model data in which the texture is set is drawn as needed to have the similar appearance to that of the observation object in the real space. Thus, the three-dimensional model data can be applied to any case when being viewed from various directions.

On the other hand, Literature 7 (formal citation provided below) discusses a method for extracting the feature and calculating the three-dimensional position only from the captured image without using the three-dimensional model data, and estimating the position and orientation while generating the three-dimensional line segment model on line. According to this method, the position and orientation can be estimated by generating three-dimensional line segment model only from the images captured in time series without using the three-dimensional model of the observation object.

The conventional technique discussed in Japanese Patent Application Laid-Open No. 2007-207251 generates the three-dimensional line segment model based on the geometric information about the three-dimensional model data which represents the shape of the surface on the observation object. However, there is no guarantee for the method for generating the three-dimensional line segment model by previously drawing the three-dimensional model data off line that the feature corresponding to the generated three-dimensional line segment model is always detected from the captured image.

That is because whether the feature corresponding to the three-dimensional line segment model can be detected from the captured image depends on a color of a surface on the observation object or an illumination environment when the image is captured. When the feature corresponding to the generated three-dimensional line segment model cannot be detected from the captured image, the line segment is highly likely to cause the erroneous correspondence. Thus, the accuracy for estimating the position and orientation can be deteriorated.

Further, since the method discussed in Literature 5 previously draws the three-dimensional model and generates the three-dimensional line segment model from a depth value of the drawn image, the feature corresponding to the generated three-dimensional line segment model cannot be always detected from the actual captured image.

Addressing the problems of the erroneous correspondence, it can be considered to make the correspondence more robust over the erroneous correspondence by using the M estimation as discussed in Literature 2. However, since the method is directed only to the three-dimensional line segment model formed of only the edges consistently detected from the captured image, the line segment is merely eliminated as an outlier when the line segment registered with the three-dimensional line segment model is not observed from the captured image.

Therefore, if there are plenty of features to be eliminated as erroneous correspondence, for example, if the three-dimensional line segment model itself is inaccurate, the position and orientation cannot be stably estimated. Furthermore, the method for improving robustness of the correspondence by using the appearance of the periphery of the line segment as discussed in Literature 4 merely eliminates the feature as the outlier when the feature corresponding to the three-dimensional line segment model is not detected from the captured image. Thus, even if the method of Literature 4 is used, the position and orientation is not stably estimated when the three-dimensional line segment model is inaccurate.

If the feature which cannot be geometrically detected but can be detected as a region having a discontinuous color, for example a design of a surface on an object, exists on the observation object, the conventional method cannot use the feature based on the color. On the contrary, the feature can cause the erroneous correspondence. The method discussed in Literature 6 uses the three-dimensional model data in which texture data is set to draw a similar appearance to that when being viewed and generates the three-dimensional line segment model including the feature based on the color to estimate the position and orientation.

However, the method of Literature 6 is directed to using the three-dimensional model data in which the texture data is set to draw the similar appearance to that when being viewed. Thus, if the appearance of the three-dimensional model data is different from that of the actual observation object, for example when the setting of the three-dimensional model data is inaccurate, or a light source changes in an actual environment, the generated three-dimensional line segment model is inaccurate. Therefore, the three-dimensional model data needs to be generated to have the similar appearance to that of the observation object. However, when the actual environment changes, there is no method for dealing with the problem.

The method discussed in Literature 3 extracts the feature based on the color as needed from the captured image on which the observation object is captured, adds the feature to the three-dimensional line segment model, and estimates the position and orientation using the extracted feature.

The method emphasizes using the feature extracted from the captured image together with the three-dimensional line segment model, which is directed to be formed of only the edges sufficiently observed as the features. Accordingly, when the three-dimensional line segment model is inaccurate, similarly to the above-described method, the erroneous correspondence frequently occurs between the three-dimensional line segment data and the edge in the captured image. Thus, the position and orientation cannot be stably estimated.

Further, the method for estimating the position and orientation by generating the three-dimensional line segment model from only the captured image as discussed in Literature 7 does not have enough accuracy for estimating the position and orientation. That is because the accuracy of the three-dimensional line segment model is deteriorated compared to the method for generating the three-dimensional line segment model using the three-dimensional model data.

Formal citations of the Literature 1-7 are as follows:

(Literature 1) T. Drummond and R. Cipolla, "Real-time visual tracking of complex structures," IEEE Transactions on Pattern Analysis and Machine Intelligence, vol. 24, no. 7, pp. 932-946, 2002.

(Literature 2) L. Vacchetti, V. Lepetit, and P. Fua, "Combining edge and texture information for real-time accurate 3D camera tracking," Proc. The 3rd IEEE/ACM International Symposium on Mixed and Augmented Reality (IS-MAR04), pp. 48-57, 2004.

(Literature 3) E. Rosten and T. Drummond, "Fusing points and lines for high performance tracking," Proc. The 10th IEEE International Conference on Computer Vision (ICCV'05), pp. 1508-1515, 2005.

(Literature 4) H. Wuest, F. Vial, and D. Stricker, "Adaptive line tracking with multiple hypotheses for augmented reality," Proc. The Fourth Int'l Symp. on Mixed and Augmented Reality (ISMAR05), pp. 62-69, 2005.

(Literature 5) G. Bleser, H. Wuest, D. Stricker, "Online camera pose estimation in partially known and dynamic scenes," Proc. The 5th IEEE/ACM International Symposium on Mixed and Augmented Reality (ISMAR06), pp. 56-65, 2006.

(Literature 6) G. Reitmayr and T. W. Drummond, "Going out: robust model-based tracking for outdoor augmented reality," Proc. The 5th IEEE/ACM International Symposium on Mixed and Augmented Reality (ISMAR06), pp. 109-118 2006.

(Literature 7) E. Eade and T. Drummond, "Edge landmarks in monocular SLAM," Proc. BMVC06, pp. 7-16, 2006.

SUMMARY OF THE INVENTION

The present invention is directed to a position and orientation measurement apparatus which can stabilize and improve position and orientation detecting processing by appropriately selecting features which are used for calculating a position and orientation from among features extracted from three-dimensional model data of an observation object. Further, the present invention is directed to a position and orientation measurement apparatus which can stably estimate the position and orientation even when the feature extracted from the three-dimensional model data of the observation object is greatly different from the feature which can be extracted from the observation object captured into the captured image.

According to an aspect of the present invention, a position and orientation measurement apparatus includes an input unit configured to input an image captured by an imaging apparatus, a storage unit configured to store three-dimensional model data which represents a surface shape of an observation object, a geometric feature extraction unit configured to extract a plurality of geometric features based on geometric information about the observation object by drawing the three-dimensional model data, a geometric feature selection unit configured to search an image feature corresponding to the plurality of geometric features in a reference image in which a position and orientation of the imaging apparatus relative to the observation object is known and to select from the plurality of geometric features the geometric feature whose corresponding image feature is detected, and a calculation unit configured to calculate the position and orientation of the imaging apparatus relative to the observation object by associating the geometric feature selected by the geometric feature selection unit with an image of the observation object in the image input by the input unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a drawing of three-dimensional model data.

DESCRIPTION OF THE EMBODIMENTS

Various exemplary embodiments, features, and aspects of the invention will be described in detail below with reference to the drawings.

Figure 1:
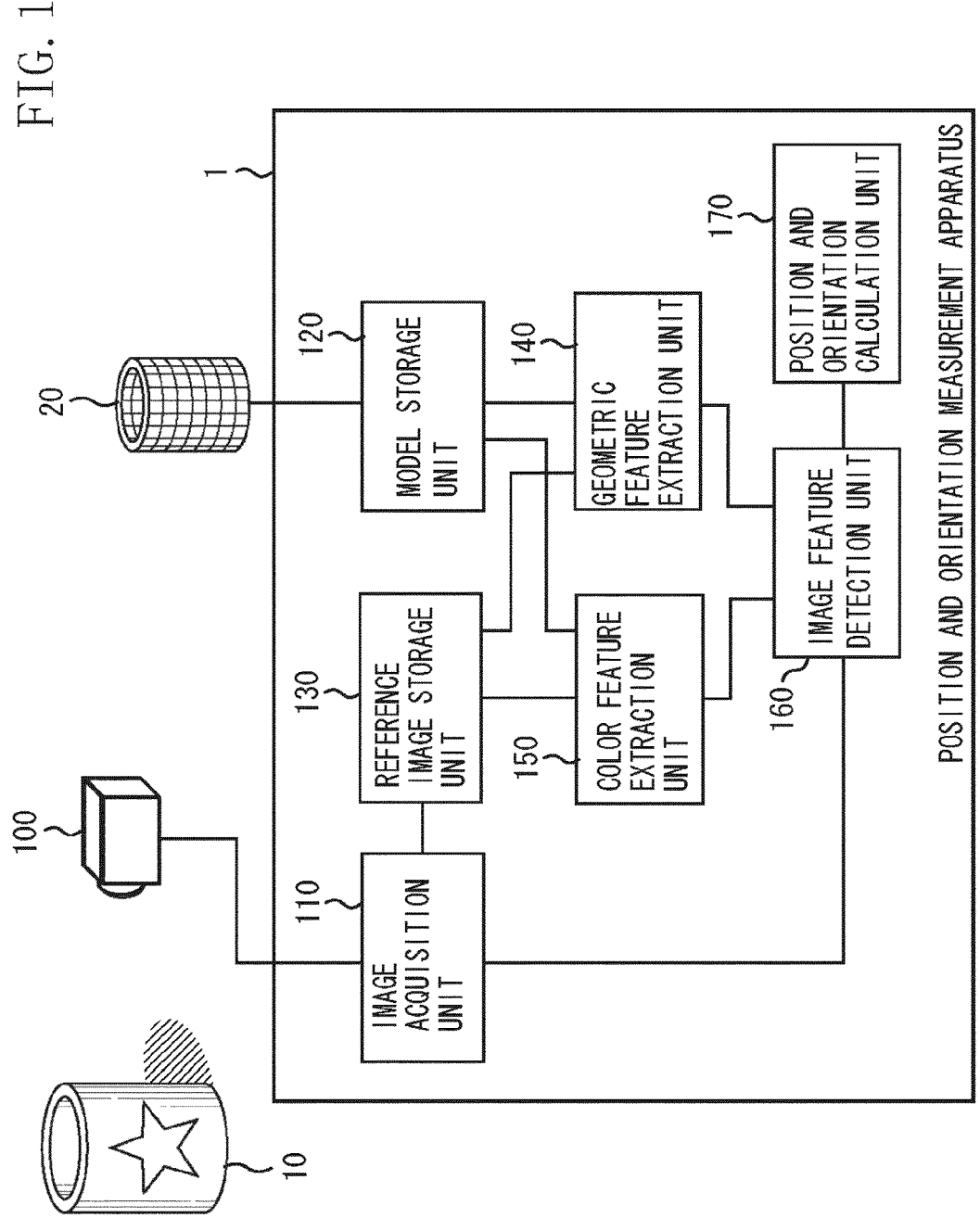
FIG. 1 illustrates a configuration of a position and orientation measurement apparatus according to a first exemplary embodiment of the present invention.

FIG. 1 illustrates a functional configuration of a position and orientation measurement apparatus 1 according to a first exemplary embodiment of the present invention. The position and orientation measurement apparatus 1 can be implemented by, for example, allowing a general computer apparatus to perform software for realizing a function which will be described below. In this case, a part or all of functional configurations which will be described below is to be performed by a central processing unit (CPU) of the computer apparatus. Second and third exemplary embodiments can be implemented similarly to the first exemplary embodiment.

As illustrated in FIG. 1, the position and orientation measurement apparatus 1 includes an image acquisition unit 110, a model storage unit 120, a reference image storage unit 130, a geometric feature extraction unit 140, a color feature extraction unit 150, an image feature detection unit 160, and a position and orientation calculation unit 170. The image acquisition unit 110 is connected to an imaging apparatus 100, which can capture a moving image including an image of an observation object 10.

The position and orientation measurement apparatus 1 acquires a position and orientation of the imaging apparatus 100 relative to the observation object 10 described in three-dimensional model data 20 of the observation object by using information about a captured image acquired by the imaging apparatus 100. As a condition for applying a position and orientation calculation by the position and orientation measurement apparatus 1 according to the present exemplary embodiment, the observation object 10 needs to be captured into the image captured by the imaging apparatus 100. Each unit included in the position and orientation measurement apparatus 1 will be described below.

The image acquisition unit 110 inputs an image captured by the imaging apparatus 100 into the position and orientation measurement apparatus 1. The image acquisition unit 110 can be implemented by an analog video capture board if the imaging apparatus outputs analog signals such as National Television System Committee (NTSC).

If the imaging apparatus outputs digital signals such as IEEE1394, the imaging apparatus can be implemented by an IEEE1394 interface board, for example. The image acquisition unit 110 may read out digital data of a still image or a moving image previously stored in a storage device.

The model storage unit 120 stores the three-dimensional model data 20 which represents a shape of a surface on the observation object 10 that is a reference for measuring the position and orientation. The three-dimensional model data 20 includes three-dimensional geometric information about the observation object and is defined by information about vertexes and information about faces formed by connecting each vertex.

The position and orientation measurement apparatus 1 may include only the information about the faces which represent a three-dimensional shape of the observation object. Thus, the three-dimensional model data 20 may be a polygonal model or a solid model which parametrically describes the information about the faces. Further, the position and orientation measurement apparatus 1 may include a processing unit which converts a format of an arbitrary three-dimensional modeler. The present exemplary embodiment uses as the three-dimensional model data 20 the polygonal model which includes the information about the vertex and the information about the face formed by connecting each vertex.

The reference image storage unit 130 stores the captured image of a past frame in which the observation object is captured and the position and orientation of the imaging apparatus relative to the observation object when the observation object is captured. As the captured image to be held as the reference image in the reference image storage unit 130, only the captured image of a just previous frame may be held, or a plurality of captured images of past frames may be held. Alternatively, of the past frames, only captured image of a frame which has a high accuracy for estimating the position and orientation may be held.

In other words, only if the captured image has the known position and orientation of the imaging apparatus relative to the observation object captured in the captured image, no matter how many pieces of captured image may be used or whatever captured image may be used. The present exemplary embodiment maintains the captured image of the just previous frame as the reference image.

The geometric feature extraction unit 140 extracts the feature (hereinafter, referred to as a "geometric feature") based on geometric information about the observation object 10 by drawing on a flat surface of the image the three-dimensional model data 20 of the observation object 10 stored in the model storage unit 120. When the three-dimensional model data 20 is drawn, as the position and orientation of the imaging apparatus 100, the position and orientation set as initial values, or a calculated current position and orientation of the imaging apparatus 100 is used.

The geometric feature extraction unit 140 selects only the geometric feature which has a high expectation to be detected in the image captured by the imaging apparatus from among the extracted geometric features while referring to the image (which is the reference image) which is stored in the reference image storage unit 130 and whose position and orientation are known. Methods for extracting and selecting the geometric feature will be described below.

The color feature extraction unit 150 extracts the image feature (hereinafter, referred to as a "color feature") based on at least one of brightness and color of the observation object from the image of the observation object in the captured image of the past frames held as the reference image in the reference image storage unit 130. Further, the color feature extraction unit 150 extracts the geometric feature of the observation object observed from the position and orientation where the reference image is stored, based on the information about the position and orientation of the observation object stored in the reference image storage unit 130 and the three-dimensional model data 20 stored in the model storage unit 120.

The color feature extraction unit 150 compares the extracted color feature with the extracted geometric feature and eliminates the color feature whose corresponding geometric feature is detected to select only the feature extracted based on the color. A method for extracting the feature based on the color will be described below.

The image feature detection unit 160 detects the image feature to be used for calculating the position and orientation of the imaging apparatus relative to the observation object in the image input by the image acquisition unit 110. According to the present exemplary embodiment, the image feature detection unit 160 detects the edge in the image. A method for detecting the edge will be described below.

Using the substantial position and orientation as an initial value of a repetitive operation, the position and orientation of the imaging apparatus relative to the observation object is calculated. More specifically, the position and orientation calculation unit 170 calculates the position and orientation of the imaging apparatus 100 in a coordinate system (hereafter, referred to as a "reference-coordinate system") relative to the observation object 10, based on the information about the image feature detected by the image feature detection unit 160, the geometric feature extracted by the geometric feature extraction unit 140, and the color feature extracted by the color feature extraction unit 150.

Figure 2:
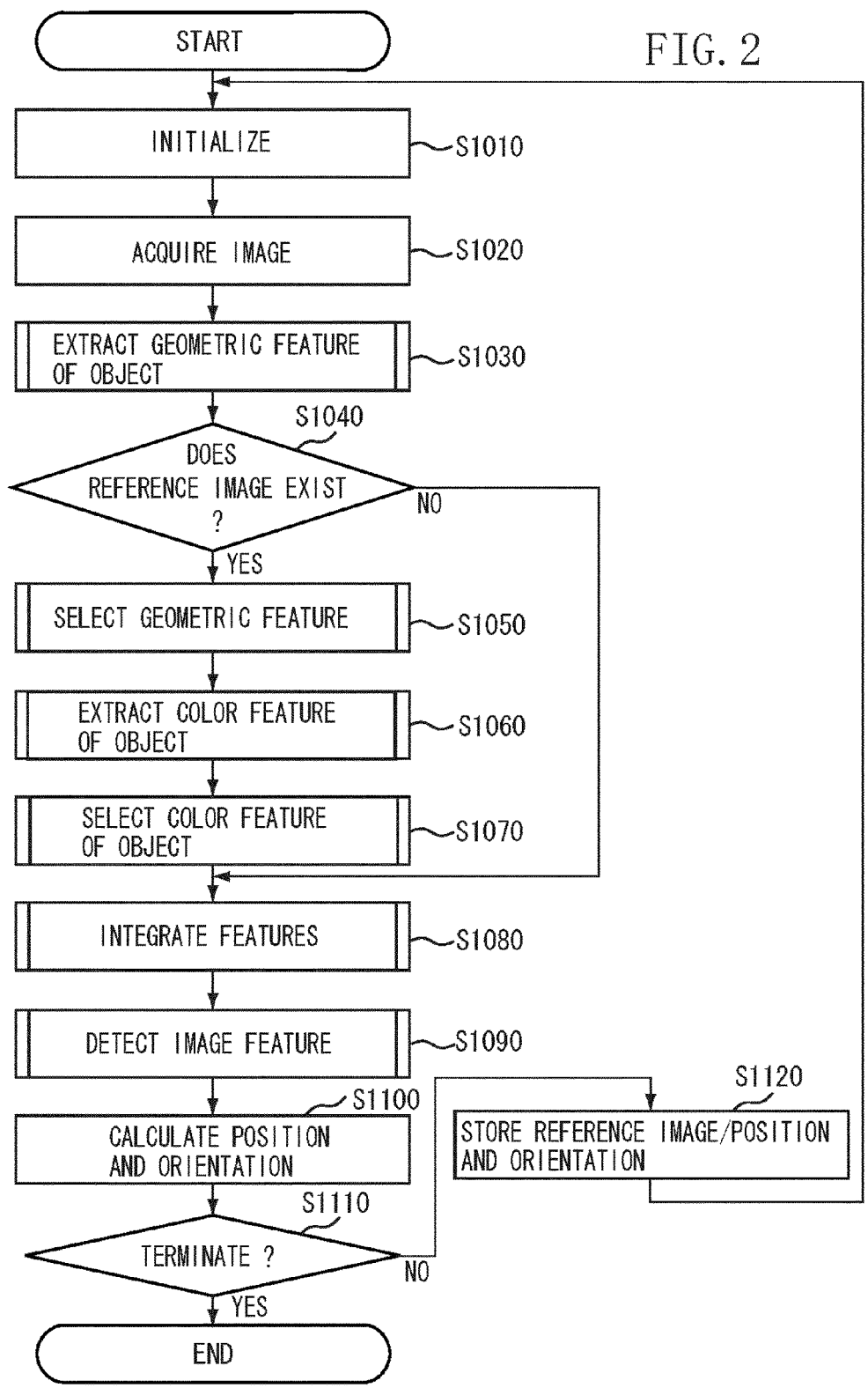
FIG. 2 is a flowchart illustrating processing of a method for measuring a position and orientation according to the first exemplary embodiment.

FIG. 2 is a flowchart illustrating processing of a method for measuring the position and orientation according to the first exemplary embodiment.

In step S1010, the position and orientation measurement apparatus 1 is initialized. The CPU of the position and orientation measurement apparatus 1 sets the substantial position and orientation of the imaging apparatus 100 relative to the observation object 10 in the reference-coordinate system.

The method for measuring the position and orientation according to the first exemplary embodiment sequentially updates the substantial position and orientation of the imaging apparatus by using information about the edge of the observation object which is captured on the captured image. Therefore, before measurement of the position and orientation is started, the substantial position and orientation needs to be previously given as an initial position and an initial orientation.

An initialization method for giving the substantial position and orientation sets, for example, a predetermined position and orientation, and moves the imaging apparatus to the predetermined position and orientation. This initializes the position and orientation measurement apparatus 1.

Alternatively, an artificial indication which can be recognized only by being detected in the image may be disposed. From a corresponding relationship between image coordinates of each vertex of the indication and the three-dimensional position in the reference-coordinate system, the position and orientation of the image apparatus may be acquired as the substantial position and orientation.

Alternatively, a natural feature point which can be readily discriminated may be previously detected, and the three-dimensional position of the natural feature point may be acquired to detect the feature point in the image when the position and orientation measurement apparatus 1 is initialized. The position and orientation of the imaging apparatus may be acquired from the correspondence relationship between the image coordinates and the three-dimensional position.

Further, the position and orientation of the imaging apparatus may be measured by a 6 degrees of freedom (6DoF) position and orientation sensor, for example, of a magnetic type, of an optical type, or of an ultrasonic type and defined as the substantial position and orientation. Using the image information such as the artificial indication and the natural feature point, and the position and orientation of the imaging apparatus which is measured by using the 6DoF position and orientation sensor, a 3 degrees of freedom (3DoF) orientation sensor, and a 3DoF position sensor, the position and orientation measurement apparatus 1 may be initialized.

In step S1020, the image acquisition unit 110 takes the image captured by the imaging apparatus 100 into the position and orientation measurement apparatus 1.

Figure 3:
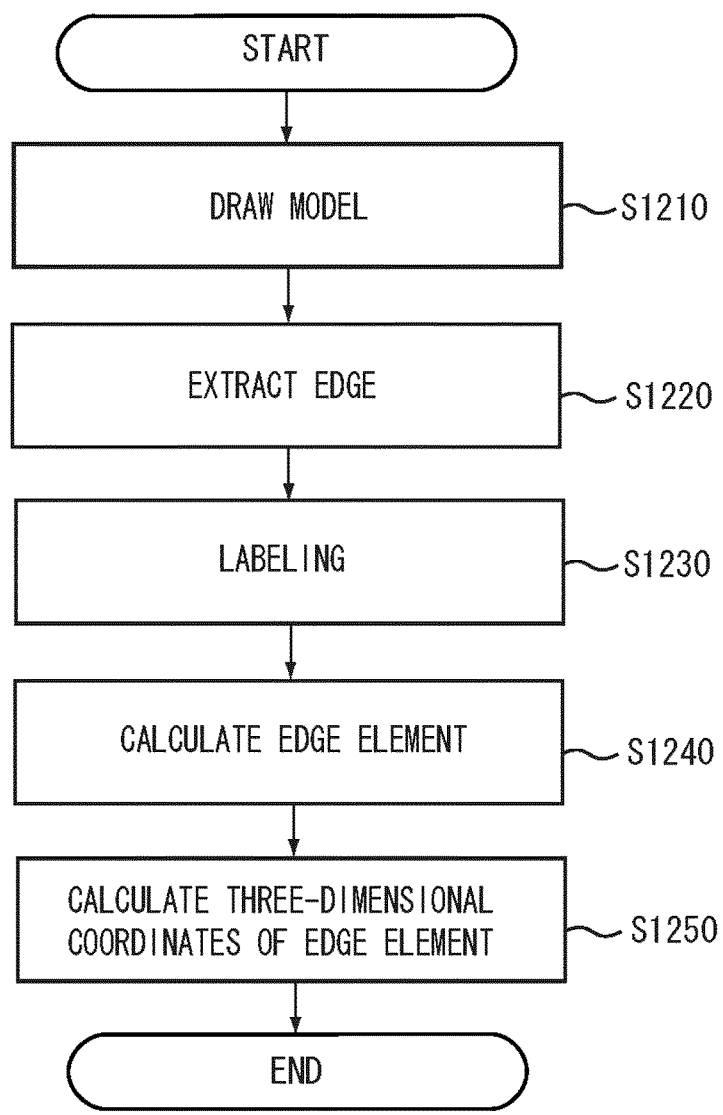
FIG. 3 is a flowchart illustrating detailed processing of a method for extracting a geometric feature of an object according to the first exemplary embodiment.

In step S1030, the geometric feature extraction unit 140 extracts the feature based on the geometric information about the observation object. The edge is the feature which is based on the geometric information and detected in the first exemplary embodiment. FIG. 3 is a flowchart illustrating detailed processing of a method for extracting the geometric feature of the observation object according to the present exemplary embodiment.

In step S1210, the geometric feature extraction unit 140 draws a model. Drawing a model is projecting the three-dimensional model of the observation object stored in the model storage unit 120 onto the flat surface of the image based on the position and orientation set in the imaging apparatus 100.

For the first model-drawn image, the substantial position and orientation, which is the initial value of the observation object acquired in step S1010 is used. For subsequent processing of the first processing, the position and orientation of the imaging apparatus 100 relative to the observation object 10 acquired just before the processing is used.

To draw the model, an inner parameter such as a focus distance and a position of a major point of a projection matrix needs to be set as well as the position and orientation of the imaging apparatus 100. According to the present exemplary embodiment, the inner parameter of the camera is previously measured to correspond to the camera actually to be used, which is the imaging apparatus 100.

Further, a maximum value and a minimum value between the viewing location and the model are set not to draw the model outside the area to decrease a cost for calculating processing for drawing the image.

FIG. 4 illustrates a result in which the three-dimensional model is drawn in step S1210. The three-dimensional model is projected onto the flat surface of the image by using the substantial position and orientation to calculate the depth buffer which stores the two-dimensional coordinates on the flat surface of the image, the luminance value of the two-dimensional coordinates, and the depth value from the flat surface of the image corresponding to the two-dimensional coordinates to the three-dimensional model.

In step S1220, the geometric feature extraction unit 140 detects the edge from the depth buffer generated in step S1210. The edge is detected from the depth buffer to acquire a region where the depth discontinuously changes.

The edge is extracted by a Canny algorism and can be used as a binary image type. In the process, the extracted edge is represented in white in the image and others are represented in black.

In step S1230, the geometric feature extraction unit 140 performs labeling on a neighboring edge in the binary image generated in step S1220 to extract an element connecting the edges. The labeling can be performed by distributing same labels, for example, if the edge exists in surrounding eight pixels of a certain pixel.

Figure 5A:
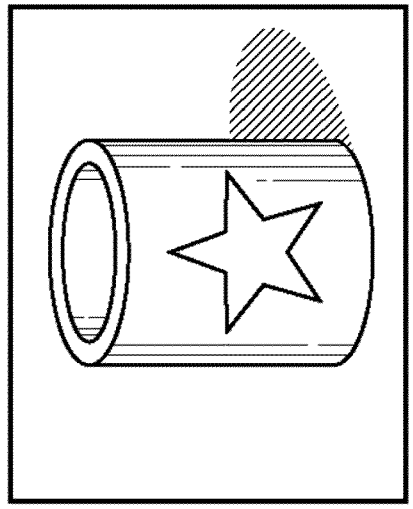
FIGS. 5A and 5B illustrate edges which are extracted from a depth buffer and superimposed onto a captured image.
Figure 5B:
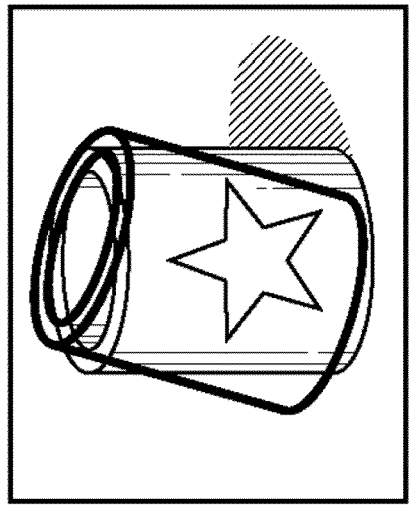

FIGS. 5A and 5B illustrate a result in which the edges from which the connecting elements are extracted in step S1230 and superimposed on the captured image. FIG. 5A illustrates the captured image, and FIG. 5B illustrates the captured image on which the extracted edges are superimposed. When the substantial position and orientation calculated in step S1010 is different from the actual position and orientation, a difference is generated between the actually captured object and the extracted edges as illustrated in FIG. 5B.

In step S1240, the geometric feature extraction unit 140 extracts the edge element from the edge from which the connecting element is extracted in step S1230. The edge element is the edge having an extremely short distance between end points in the image. A division point is calculated to equally divide the edge on which the labeling is performed, and the extremely short connecting element in a periphery of the division point is acquired to extract the edge element.

Figure 6:
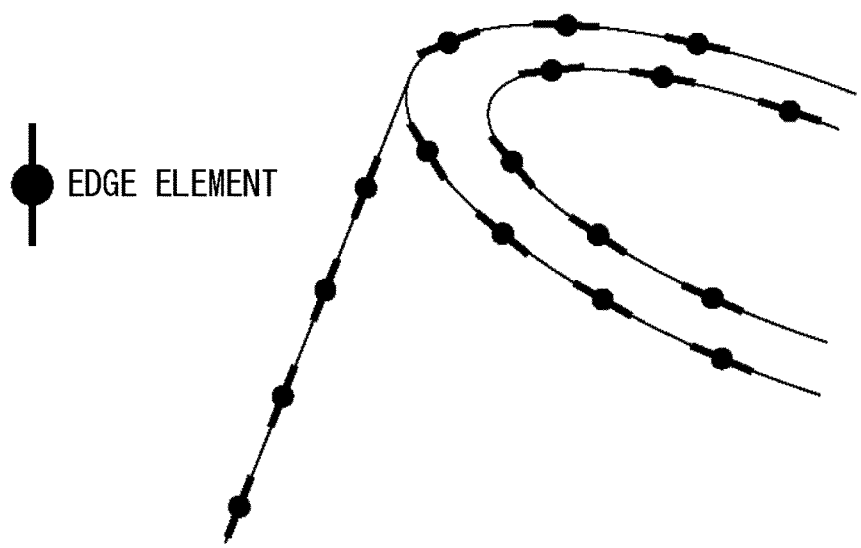
FIG. 6 illustrates extraction of edge elements.

FIG. 6 illustrates the edge elements extracted at an equal interval from the edge on which the labeling is performed. According to the present exemplary embodiment, the connecting elements located three pixels away from the division point are set as end points, which are a start point and a terminus point, and the edge element centering on the division point is extracted.

A total number of the edges extracted from the depth buffer is defined as an "N", and each edge element is represented as "GFi" (i=1, 2, . . . , N). The larger the number "N" of edge elements are, the longer the processing time is. Therefore, processing time can be controlled by changing the interval for extracting the edge element on the image. Further, the edge elements may be selected in a constant number and the interval between the edge elements on the image may be sequentially changed so that the processing time can be constant.

In step S1250, the geometric feature extraction unit 140 acquires the three-dimensional coordinates in the reference-coordinate system of the edge element calculated in step S1240. To acquire the three-dimensional coordinates, the depth buffer generated in step S1210 can be used. As described above, the depth buffer stores the depth value corresponding to the image coordinates.

The depth value stored in the depth buffer is regularized to a value from "0" to "1" by the maximum value and the minimum value of the distance from the viewing location to the model, which are used in a rendering process in step S1210. Therefore, the three-dimensional coordinates in the reference-coordinate system cannot be directly acquired from the depth value stored in the depth buffer.

To acquire the three-dimensional coordinates, firstly, the value in the depth buffer is converted into the distance from the viewing location to the edge element in a camera coordinate system by using the maximum value and the minimum value of the distance described above. At the same time, the three-dimensional coordinates of the edge element in the camera coordinate system are acquired by using the inner parameter of the projection matrix.

Secondary, reversed conversion of the position and orientation used in the rendering process is performed on the three-dimensional coordinates in the camera coordinated system to acquire the three-dimensional coordinates of the edge element in the reference-coordinate system. A set of the edge elements "GFi" whose three-dimensional coordinates are calculated is hereafter referred to as "geometric feature models".

In step S1040, it is determined whether the captured image of the past frame as the reference image is stored in the reference image storage unit 130. When the reference image is stored (YES in step S1040), the processing proceeds to step S1050. When the reference image is not stored (NO in step S1040), the processing skips following steps of step S1050 in which the captured image of the past frame is used and proceeds to step S1080. Particularly, since the most initial frame has no captured image of the past frame, which is the reference image, the processing automatically proceeds to step S1080.

In step S1050, the geometric feature extraction unit 140 selects the geometric feature extracted in step S1030 by using the captured image of the past frame stored in the reference image storage unit 130.

In other words, the geometric feature extraction unit 140 searches the image feature corresponding to the plurality of geometric features extracted in step S1030 in the reference image which has the calculated or a known position and a known orientation of the imaging apparatus 100 relative to the observation object 10. The geometric feature extraction unit 140 eliminates the geometric feature whose corresponding image feature is detected from the plurality of geometric feature to select the geometric feature.

Figure 7:
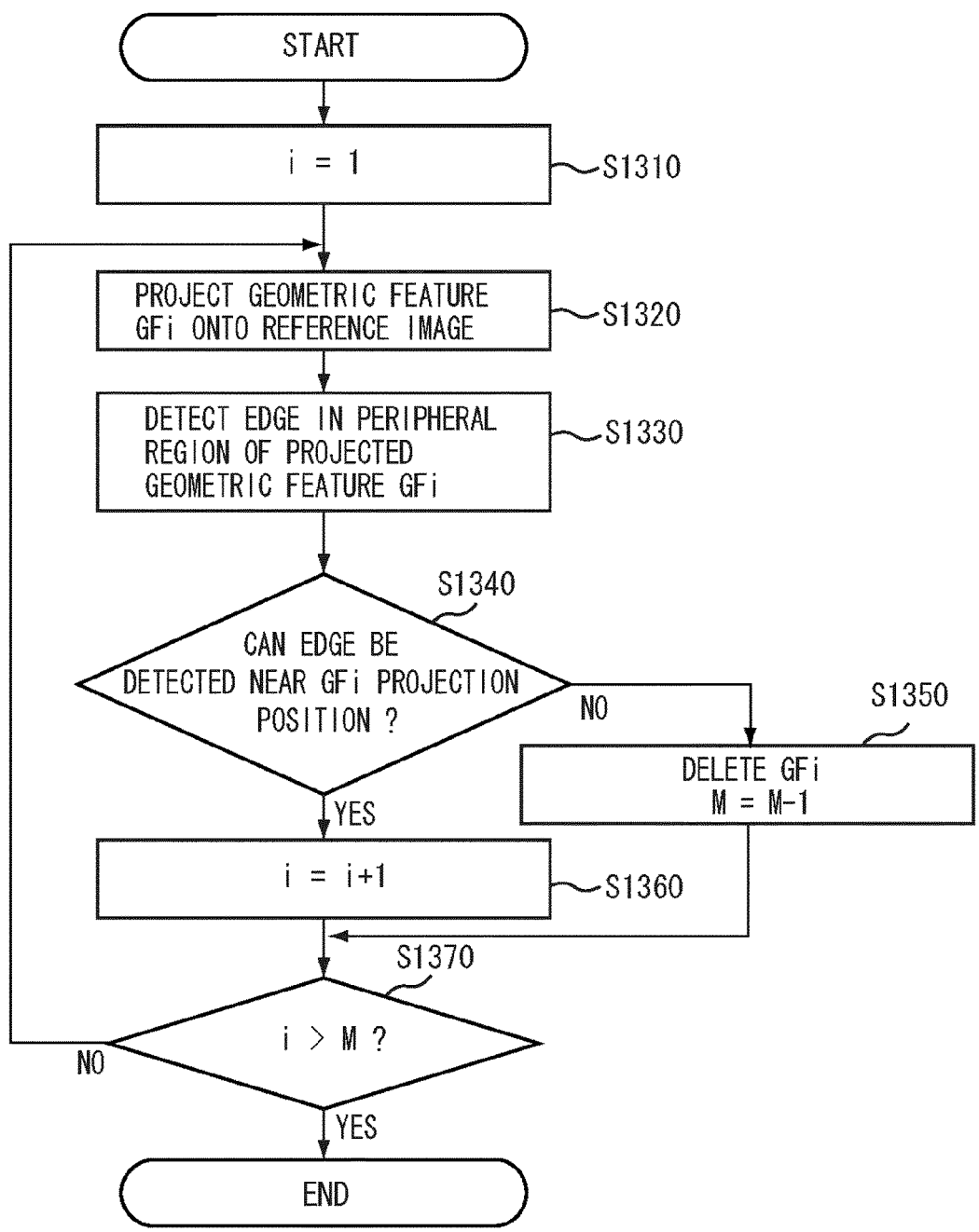
FIG. 7 is a flowchart illustrating detailed processing for selecting the geometric feature of the object according to an exemplary embodiment of the present invention.

FIG. 7 is a flowchart illustrating detailed processing of a method for selecting the geometric feature of the observation object according to the exemplary embodiments.

In step S1310, the geometric feature extraction unit 140 sets a variable "i" to "1". The processing proceeds to step S1320.

In step S1320, the geometric feature extraction unit 140 acquires information about the position and orientation of the imaging apparatus relative to the observation object which is stored with the reference image in the reference image storage unit 130.

The geometric feature extraction unit 140 projects, based on the acquired relative position and orientation, the three-dimensional coordinates of the edge element "GFi" of the geometric feature model acquired in step S1030 into the reference image to acquire the two-dimensional coordinates of the edge element "GFi" of the geometric feature model in the reference image.

Figure 8A:
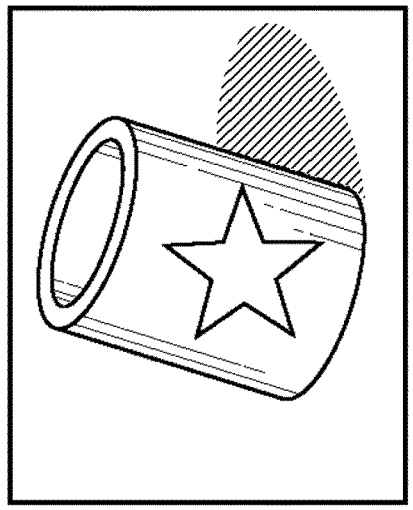
FIGS. 8A and 8B illustrate how the edge elements of a geometric feature model are projected onto a reference image.
Figure 8B:
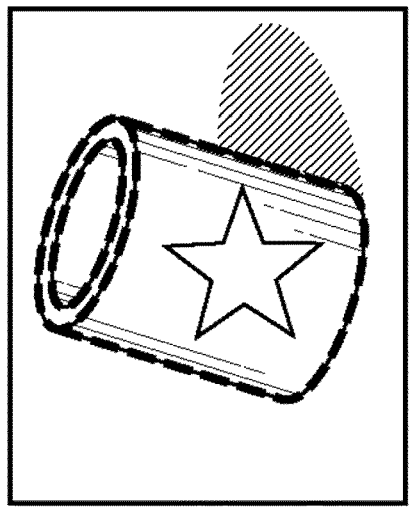

FIG. 8A illustrates the reference image stored in the reference image storage unit 130. FIG. 8B illustrates the reference image on which the projected edge elements are superimposed. As illustrated in FIG. 8B, the edge elements are projected at a position where the edge elements are superimposed onto the observation object captured on the reference image, based on the information about the position and orientation stored in the reference image storage unit 130.

In step S1330, the geometric feature extraction unit 140 calculates a density gradient on the line segment (hereafter, referred to as a "search line") which passes through a center point of the edge element and is parallel in the direction of the normal line of the straight line connecting the end points, which are the start point and the terminus point, of the two-dimensional coordinates acquired in step S1320.

In step S1340, the geometric feature extraction unit 140 calculates whether an extreme value of the density gradient exists.

Figure 9:
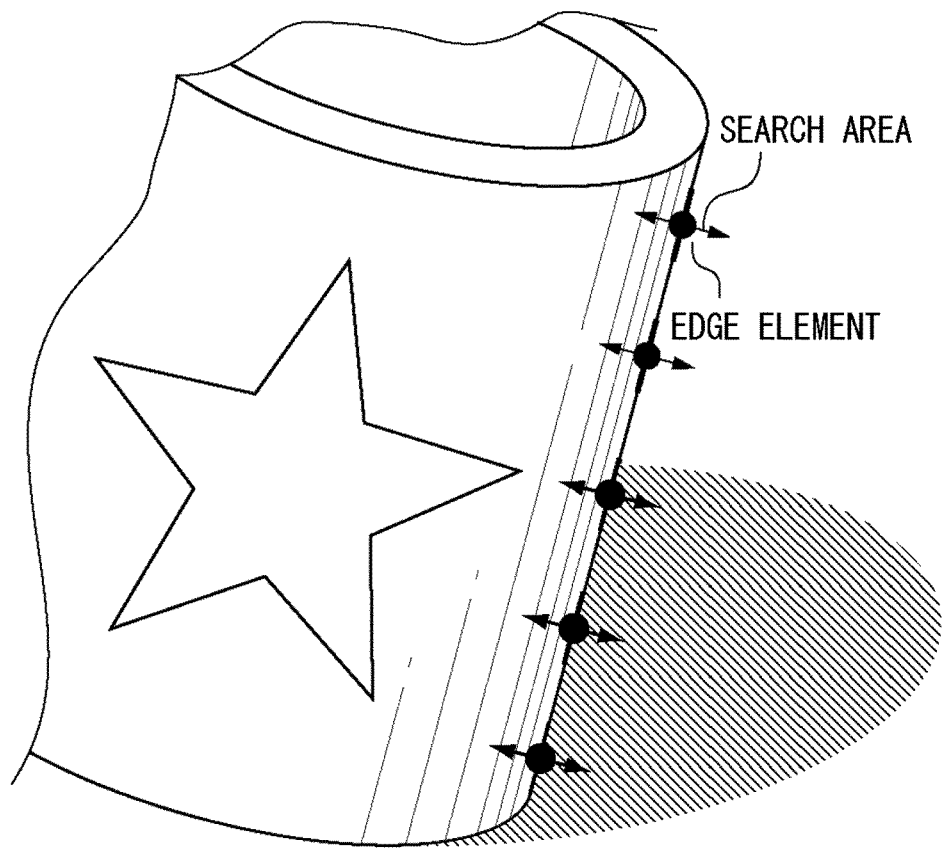
FIG. 9 illustrates how the edges are searched near the edge elements of the geometric feature model.

FIG. 9 illustrates how to determine the feature according to the present exemplary embodiment. As a lower edge element illustrates in FIG. 9, when the extreme value does not exist on the search line near the edge element (NO in step S1340), the geometric feature is considered not to be detected from the captured image. Thus, in step S1350, the edge element "GFi" is eliminated to decrease the total number "N" of the geometric feature by one.

As an upper edge element illustrates in FIG. 9, when the extreme value exists near the edge element (YES in step S1340), the geometric feature is considered to be detected from the captured image and the processing proceeds to step S1360. According to the present exemplary embodiment, the area near the edge element is defined to be a range within five pixels toward both directions of the search line from the center point.

In step S1360, the geometric feature extraction unit 140 increases the variable "i" by "1", and the processing proceeds to step S1370. In step S1370, the geometric feature extraction unit 140 determines whether the above-described processing has been terminated on all of the edges "GFi".

When the processing has been terminated on all of the edges "GFi" (YES in step S1370), the determination processing ends. When the processing has not been terminated on all of the edges "GFi" (NO in step S1370), the processing returns to step S1320.

By the above-described processing, the edge element which has a low possibility to be detected from the reference image is eliminated from the geometric feature model. The edge element which is not eliminated is to be selected as the edge having a high expectation to be detected from the captured image.

In step S1060, the color feature extraction unit 150 detects the feature, which is the image feature, based on the color information of the observation object from the captured image, which is the reference image, of the past frame stored in the reference image storage unit 130. Such processing is referred to as "image feature extraction processing".

Figure 10:
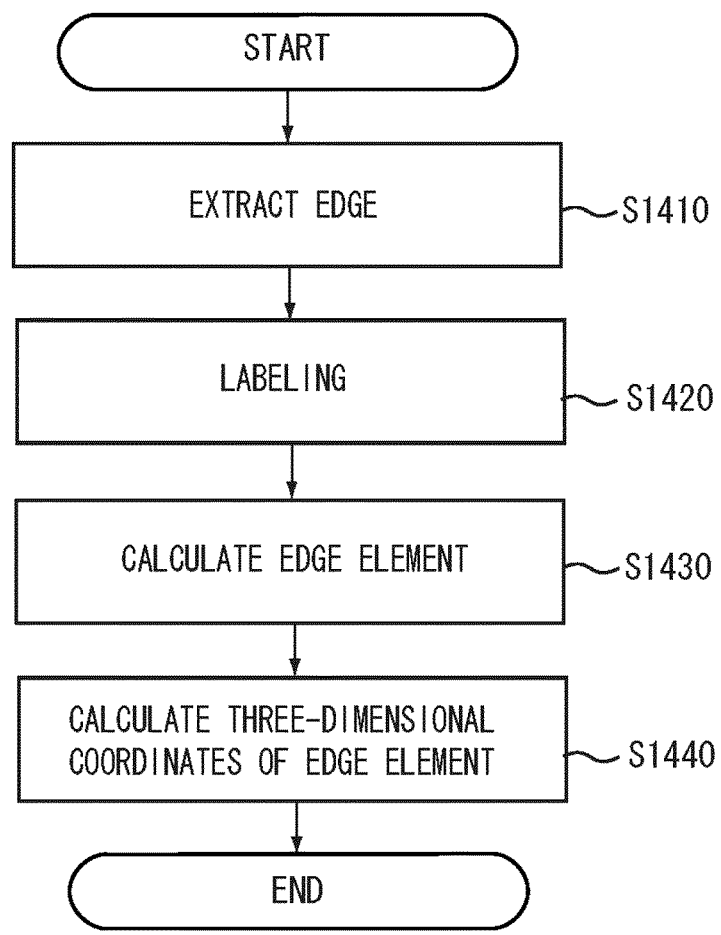
FIG. 10 is a flowchart illustrating detailed processing for extracting a feature of an object color according to the first exemplary embodiment.

FIG. 10 is a flowchart illustrating detailed processing of a method for detecting the feature based on the color of the observation object from the captured image, which is the reference image, of a previous frame according to the present exemplary embodiment.

In step S1410, the color feature extraction unit 150 extracts the edge from the reference image stored in the reference image storage unit 130. The reference image is used for detecting the edge to acquire the region where the luminance value discontinuously changes. The method for detecting the edge is similar to that of the processing described in step S1220. Unlike the processing in step S1220, the reference image is used as an object to detect the edge.

In step S1420, the color feature extraction unit 150 performs the labeling of the edge extracted in step S1410 and extracts the connecting element of the edges. The labeling method is similar to that described in step S1230.

In step S1430, the color feature extraction unit 150 extracts the edge element from the connecting element of the edges extracted in step S1420. The method for extracting the edge element is similar to that described in step S1240.

In step S1440, the color feature extraction unit 150 calculates the three-dimensional coordinates on the reference coordinates of the edge element extracted in step S1430. The color feature extraction unit 150 draws the three-dimensional model data 20 stored in the model storage unit 120 based on the position and orientation of the imaging apparatus relative to the observation object stored in the reference image storage unit 130, and acquires the depth buffer of the reference image.

The color feature extraction unit 150 calculates the three-dimensional coordinates of the edge element by using the acquired depth buffer. The method for calculating the three-dimensional coordinates of the edge element from the depth buffer is similar to that described in step S1250. The set of the edge elements "CFj" based on a boundary of the color on the reference image from which the three-dimensional coordinates in the reference-coordinate system is calculated is hereafter referred to as a "color feature model".

In step S1070, the color feature extraction unit 150 selects the color feature extracted in step S1060 by using the depth buffer generated in step S1440. Such processing is referred to as "image feature selection processing".

Figure 11:
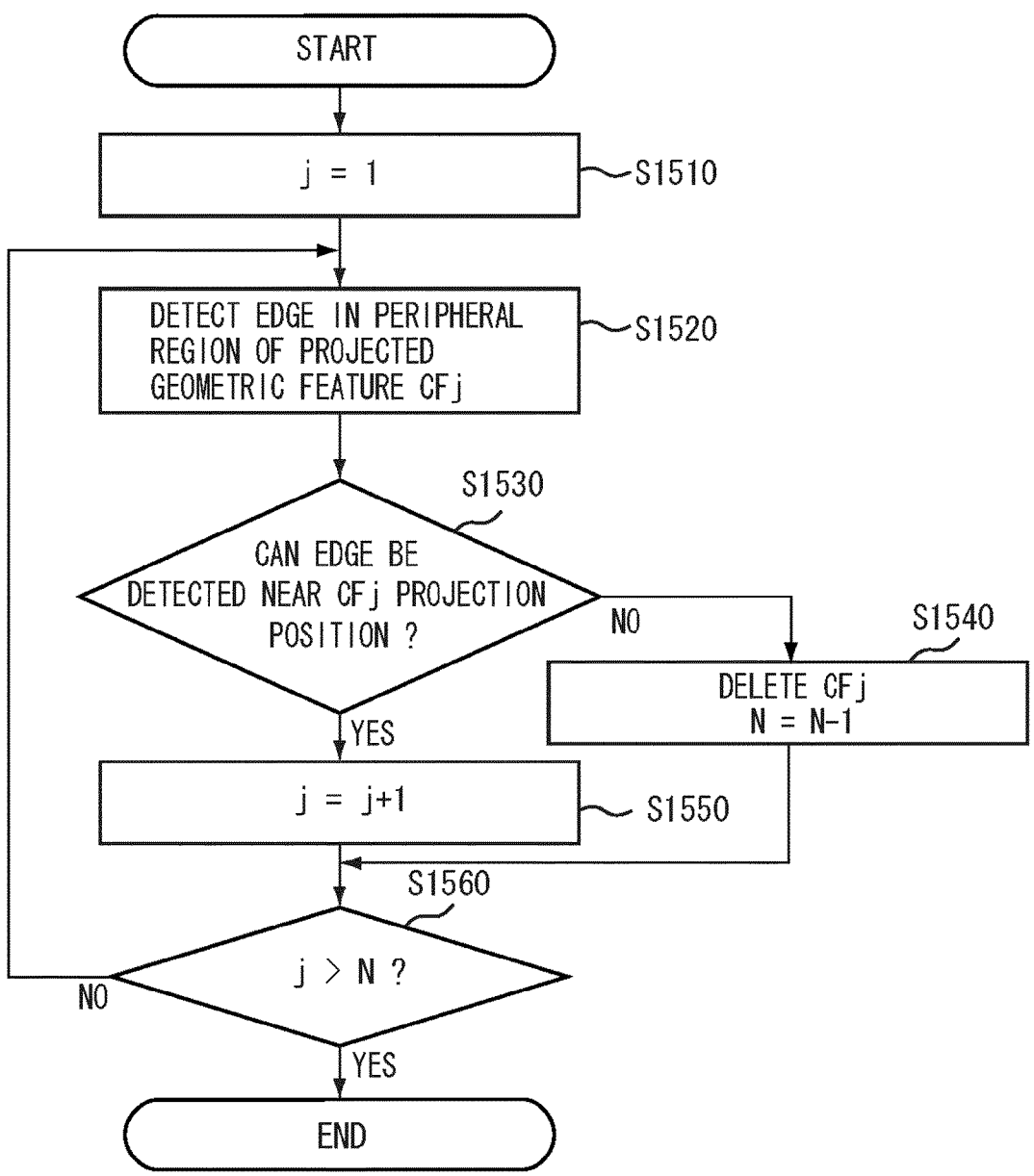
FIG. 11 is a flowchart illustrating detailed processing for selecting the feature of the object color according to the first exemplary embodiment.

FIG. 11 is a flowchart illustrating detailed processing of a method for selecting the edge element "CFi" of the color feature model of the observation object according to the present exemplary embodiment.

In step S1510, the color feature extraction unit 150 sets a variable "j" to "1", and the processing proceeds to step S1520.

In step S1520, the color feature extraction unit 150 calculates the slope of the depth value on the depth buffer acquired in step S1440 on the search line of the edge element "CFi" based on the color feature acquired in step S1430.

In step S1530, the color feature extraction unit 150 determines whether the extreme value is detected from the density gradient on the depth buffer acquired in step S1520. When the extreme value is detected from the depth buffer near the edge element (YES in step S1530), the color feature extraction unit 150 regards that the edge element can be extracted geometrically too. Thus, the edge element "CFj" is eliminated in step S1540.

When the extreme value is not detected from the depth buffer near the edge element (NO in step S1530), the color feature extraction unit 150 regards that the edge element is based on the color of an object surface, and the processing proceeds to step S1550.

In step S1550, the color feature extraction unit 150 increases the variable "j" by "1", and the processing proceeds to step S1560. In step S1560, it is determined whether the processing has been terminated on all of the edge elements "CFj".

When the processing has been terminated on all of the edge elements (YES in step S1560), the determination processing ends. When the processing has not been terminated on all of the edge elements (NO in step S1560), the processing returns to step S1320. By the above-described processing, the edge element which can be detected geometrically too is eliminated from the color feature mode, and only the edge element based on the boundary of the color of the object surface is selected.

In step S1080, the image feature detection unit 160 integrates the color feature selected by the image feature selection processing and the geometric feature selected by the geometric feature selection processing as an object feature. More specifically, the image feature detection unit 160 generates the object feature model by integrating the geometric feature model generated in step S1030 and the color feature model generated in step S1060.

The object feature model is formed of a set including the edge element of the geometric feature model and the edge element of the color feature model. A total number of edge elements of the object feature model is defined as "L", and each edge element is represented as "OFk" (k=1, 2, ..., L). The total number "L" is acquired by adding a total number "M" of the geometric feature model and a total number "N" of the color feature model.

According to the present exemplary embodiment, the total number "M" of the geometric feature model and the total number "N" of the color feature model are selected by the selection processing in each step of S1050 and S1070.

Figure 12:
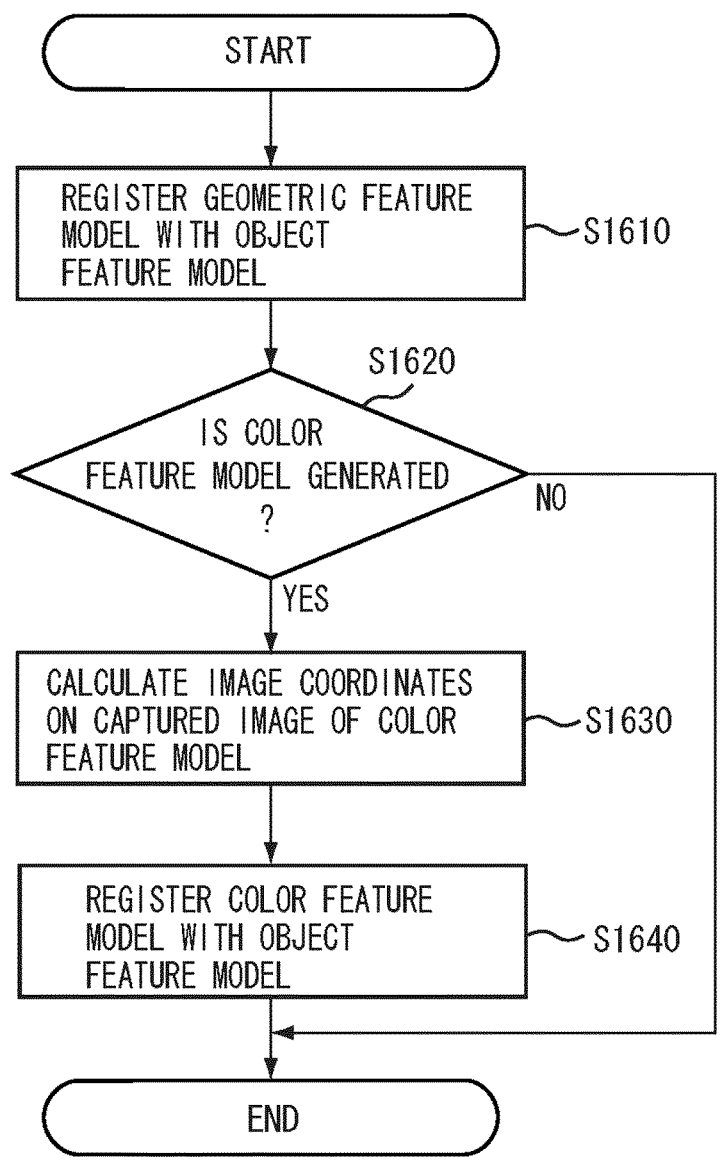
FIG. 12 is a flowchart illustrating detailed processing for integrating the geometric feature model and the color feature model according to the first exemplary embodiment.

FIG. 12 is a flowchart illustrating detailed processing of a method for integrating the geometric feature model and the color feature model of the observation object according to the present exemplary embodiment.

In step S1610, the image feature detection unit 160 registers with the object feature model the geometric feature model which are generated in sep S1030 and formed of the edge elements selected in step S1050. The total number "M" of the geometric feature model is added to the total number "L" of the object feature model.

When the color feature model is generated in step S1620 (YES in step S1620), the processing proceeds to step S1630. When the color feature model is not generated in step S1620 (NO in step S1620), the processing ends.

In step S1630, the image feature detection unit 160 projects the three-dimensional coordinates of the color feature model based on the substantial position and orientation acquired in step S1010 and calculates the image coordinates on the captured image of the current frame. The image coordinates on the captured image corresponding to the three-dimensional coordinates of the geometric feature model has been already calculated by processing for drawing the model/extracting the edge element in step S1030.

In step S1640, the color feature model whose image coordinates are acquired in step S1630 is registered with the object feature model, and the total number "N" of the color feature model is added to the total number "L" of the object feature model.

In step S1090, the image feature detection unit 160 detects the image feature of the captured image of the current frame which corresponds to the edge element "OFk" (k=1, 2, ..., L) of the object feature model acquired in step S1090 and is captured by the imaging apparatus 100. The image feature according to the present exemplary embodiment is the edge.

Figure 13:
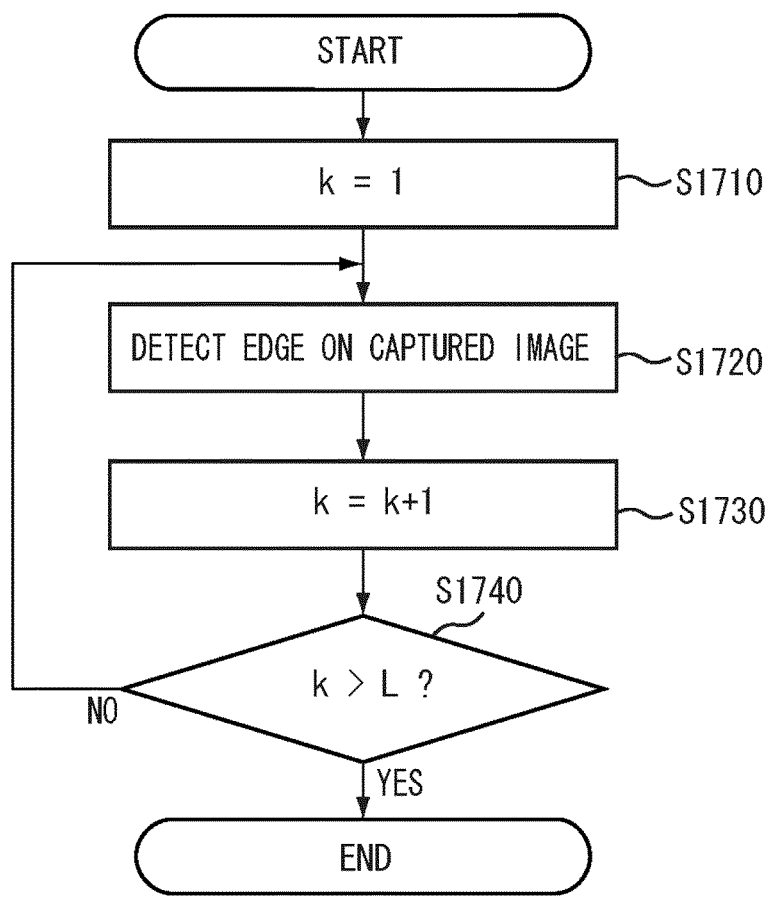
FIG. 13 is a flowchart illustrating detailed processing for extracting an image feature from a captured image of a current frame according to the first exemplary embodiment.
Figure 14A:
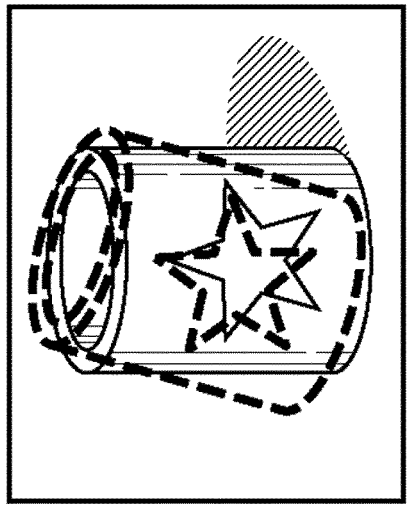
FIGS. 14A and 14B illustrate how to superimpose edge elements of an object feature model onto the captured image of the current frame according to the first exemplary embodiment.
Figure 14B:
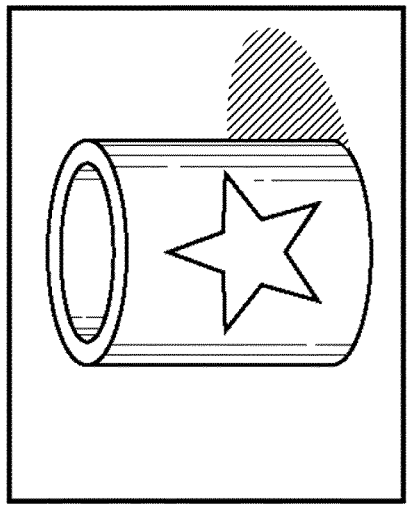

FIG. 13 is a flowchart illustrating detailed processing of a method for extracting the edge according to the present exemplary embodiment. FIGS. 14A and 14B illustrate a result in which the edge elements "OFk" of the object feature model is superimposed onto the captured image. FIG. 14A illustrates the captured image, and FIG. 14B illustrates the captured image on which the edge elements of the object feature model are superimposed. Similarly to steps S1330 and S1520, the edge around the image coordinates of the edge element is extracted from the captured image.

In step S1710, the image feature detection unit 160 sets a variable "k" to "1", and the processing proceeds to step S1720.

In step S1720, the image feature detection unit 160 detects the edge corresponding to the edge element "OFk" of the object feature model from the image. On the search line of the edge element "OFk", the extreme value is calculated from the density gradient on the captured image, which is the line segment in the direction of the normal line of the edge element.

The edge exists at a position where the density gradient has the extreme value on the search line. According to the present exemplary embodiment, when a plurality of edges exist on the search line, the edge closest to the center point of the edge element is defined as a corresponding point. The image coordinates of the corresponding point and the three-dimensional coordinates of the edge element "OFk" are held.

The present exemplary embodiment defines the closest edge to the edge element "OFk" as the corresponding point. However, the corresponding point is not limited to that in the present exemplary embodiment. For example, the edge having the greatest absolute value of the extreme value for the density gradient may be defined as the corresponding point. Further, even if a plurality of points (not one point) are held as candidates of the corresponding point, an essential quality of the present invention will not be deteriorated.

In step S1730, the image feature detection unit 160 increases the valuable "k" by "1", and the processing proceeds to step S1740. When the processing has terminated on all of the edge elements "OFk" (YES in step S1740), the processing ends. When the processing has not terminated on all of the edge elements "OFk", the processing returns to step S1720, and the above processing is repeated.

In step S1100, the position and orientation calculation unit 170 calculates the position and orientation of the imaging apparatus 100 relative to the observation object 10. The relative position and orientation can be calculated by associating the image of the observation object of the current frame with the object feature which is acquired by integrating the geometric feature selected by the geometric feature selection processing and the color feature selected by the image feature selection processing.

More specifically, the position and orientation calculation unit 170 calculates the position and orientation of the imaging apparatus by performing the repetitive operation to correct the substantial position and orientation of the imaging apparatus relative to the observation object by using a nonlinear optimization calculation. Of the edge elements "OFk" of the object feature model generated in step S1080, a total number of edge elements whose corresponding points are acquired in step S1090 is defined as "Lc".

Figure 15:
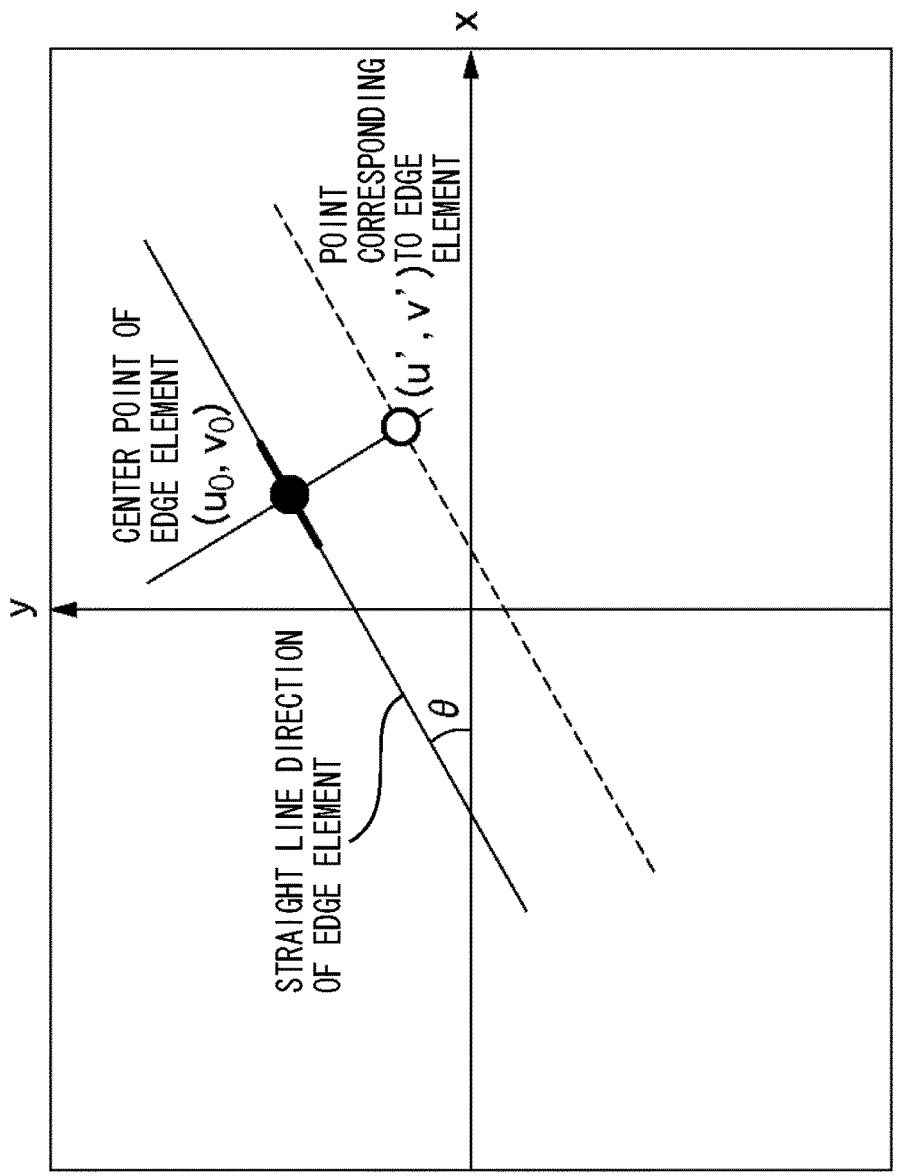
FIG. 15 illustrates a method for calculating the position and orientation of an imaging apparatus by using information about edges.

FIG. 15 illustrates a method for calculating the position and orientation of the imaging apparatus by using the information about the edge. In FIG. 15, the horizontal direction of the image and the vertical direction thereof are defined as an "X" axis and a "y" axis, respectively.

Image coordinates in which a center point of an edge element is projected is represented as $(u_0, v_0)$. A slope of a straight line of the edge element on the image with respect to the "x" axis is represented as "θ". The slope "θ" is calculated as the slope of the straight line connecting the two-dimensional coordinates of the end points, which are the start point and the terminus point) of the edge elements on the captured image. A vector of the normal line of the straight line of the edge element on the image is represented as (sin θ, −cos θ). The image coordinates of the corresponding point of the edge element are defined as (u', v').

An equation of a straight line which passes through a point (u, v) and has a slope "θ" is represented as follows.

$$x \sin\theta - y \cos\theta = u \sin\theta - v \cos\theta \qquad (1)$$

The image coordinates of the edge element on the captured image changes depending on the position and orientation of the imaging apparatus. The degree of freedom of the position and orientation of the imaging apparatus is 6DoF. A parameter which represents the position and orientation of the imaging apparatus is represented as "s". "s" represents a six-dimensional vector and, includes three elements which represent the position of the imaging apparatus and another three elements which represent the orientation thereof.

The three elements which represent the orientation are expressed, for example, by using an Eulerian angle or expressed by a three-dimensional vector whose direction represents a rotational axis and whose size represents a rotational angle.

The image coordinates of the center point of the edge element (u, v) can be approximated by a primary Taylor expansion near $(u_0, v_0)$ as follows.

$$u \approx u_0 + \sum_{i=1}^{6} \frac{\partial u}{\partial s_i} \Delta s_i, \; v \approx v_0 + \sum_{i=1}^{6} \frac{\partial v}{\partial s_i} \Delta s_i \qquad (2)$$

Since a method for leading to partial differentiations for "u" and "v" in equations (2) are widely known and discussed in, for example, K. Satoh, S. Uchiyama, H. Yamamoto, and H. Tamura, "Robust vision-based registration utilizing bird's-eye view with user's view," Proc. The 2nd IEEE/ACM International Symposium on Mixed and Augmented Reality (IS-MAR03), pp. 46-55, 2003, the details are not described here.

Equation (2) is substituted into equation (1) to acquire equation (3).

$$x\sin\theta - y\cos\theta = \left(u_0 + \sum_{i=1}^{6} \frac{\partial u}{\partial s_i}\Delta s_i\right)\sin\theta - \left(v_0 + \sum_{i=1}^{6} \frac{\partial v}{\partial s_i}\Delta s_i\right)\cos\theta \qquad (3)$$

A correction value "Δs" of the position and orientation "s" of the imaging apparatus is calculated such that a straight line represented by equation (3) passes through the image coordinates (u', v') of the corresponding point of the edge element. When equations $r_0 = u_0 \sin\theta - v_0 \cos\theta$ (a constant), $d = u' \sin\theta - v' \cos\theta$ (a constant) are defined, equation (4) is acquired as follows.

$$\sin\theta \sum_{i=1}^{6} \frac{\partial u}{\partial s_i}\Delta s_i - \cos\theta \sum_{i=1}^{6} \frac{\partial v}{\partial s_i}\Delta s_i = d - r_0 \qquad (4)$$

Since equation (4) satisfies a number Lc of edge elements, linear simultaneous equations such as equation (5) satisfy "Δs".

$$\begin{bmatrix} \sin\theta_1 \frac{\partial u_1}{\partial s_1} - & \sin\theta_1 \frac{\partial u_1}{\partial s_2} - & \cdots & \sin\theta_1 \frac{\partial u_1}{\partial s_6} - \\ \cos\theta_1 \frac{\partial v_1}{\partial s_1} & \cos\theta_1 \frac{\partial v_1}{\partial s_2} & & \cos\theta_1 \frac{\partial v_1}{\partial s_6} \\ \sin\theta_2 \frac{\partial u_2}{\partial s_1} - & \sin\theta_2 \frac{\partial u_2}{\partial s_2} - & \cdots & \sin\theta_2 \frac{\partial u_2}{\partial s_6} - \\ \cos\theta_1 \frac{\partial v_2}{\partial s_1} & \cos\theta_1 \frac{\partial v_2}{\partial s_2} & & \cos\theta_1 \frac{\partial v_2}{\partial s_6} \\ \vdots & \vdots & \ddots & \vdots \\ \sin\theta_{L_c} \frac{\partial u_{L_c}}{\partial s_1} - & \sin\theta_{L_c} \frac{\partial u_{L_c}}{\partial s_2} - & \cdots & \sin\theta_{L_c} \frac{\partial u_{L_c}}{\partial s_6} - \\ \cos\theta_{L_c} \frac{\partial v_{L_c}}{\partial s_1} & \cos\theta_{L_c} \frac{\partial v_{L_c}}{\partial s_2} & & \cos\theta_{L_c} \frac{\partial v_{L_c}}{\partial s_6} \end{bmatrix} \quad (5)$$

$$\begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ d_{L_c} - r_{L_c} \end{bmatrix}$$

Equation (5) is simply expressed as equation (6).

$$J\Delta s = E \quad (6)$$

Based on equation (6), "$\Delta s$" can be acquired by using a generalized inverse matrix $(J^t J)^{-1}$ of a matrix "J" by a Gauss-Newton method. However, since the edge is often erroneously detected, the Robust Estimation Method is used as described below. In general, the edge element corresponding to the erroneously-detected edge has a large error "d−r".

Therefore, the error gives a great contribution on simultaneous equations (5) and (6), thus resulting in decreasing an accuracy of "$\Delta s$" to be acquired. Thus, a smaller weight is given to data of the edge element having a larger error "d−r", and a heavier weight is given to data of the edge element having a smaller error "d−r". The weight is given by a Tukey function as described in equation (7A).

$$w(d-r) = \begin{cases} (1-((d-r)/c)^2)^2 & |d-r| \le c \\ 0 & |d-r| > c \end{cases} \quad (7A)$$

"c" is a constant. The function which gives the weight does not need to be the Tukey function, but any function may be used which gives the smaller weight to the edge element having the larger error "d−r" and the heavier weight to the edge element having the smaller error "d−r" such as a Huber function as described in equation (7B) below.

$$w(d-r) = \begin{cases} 1 & |d-r| \le k \\ \dfrac{k}{|d-r|} & |d-r| > k \end{cases} \quad (7B)$$

Weight corresponding to the edge element "OFk" is defined as "$w_i$". A weight matrix "W" is defined as described by equation (8).

$$W = \begin{bmatrix} w_1 & & & 0 \\ & w_2 & & \\ & & \ddots & \\ 0 & & & w_{L_c} \end{bmatrix} \quad (8)$$

The weight matrix "W" is an "Lc×Lc" square matrix in which all the components except for a diagonal component, to which weight $w_i$ is added, are 0. By using the weight matrix "W", equation (6) is modified to equation (9).

$$WJ\Delta s = WE \quad (9)$$

Equation (9) is solved to acquire the correction value "$\Delta s$" as described by equation (10).

$$\Delta s = (J^T WJ)^{-1} J^T WE \quad (10)$$

By using "$\Delta s$" acquired as described above, the position and orientation of the imaging apparatus is updated. It is determined whether the repetitive operation for the position and orientation of the imaging apparatus is converged. When the correction value "$\Delta s$" is small enough, when a total sum of the error "r−d" is small enough, or when the total sum of the terror "r−d" does not change, it is determined that the calculation for the position and orientation of the imaging apparatus has converged.

When it is determined that the calculation has not converged, the slope of the line segment "0", the partial differentiations for "$r_0$" and "d", and "u" and "v" are calculated again using the updated position and orientation of the imaging apparatus to acquire the correction value "$\Delta s$" again. The Gauss-Newton Method is used as the nonlinear optimization method.

However the nonlinear optimization method is not limited to the Gauss-Newton Method but another nonlinear optimization method, for example, the Newton-Raphson Method, the Levenberg-Marquardt Method, the Steepest Descent Method, and the Conjugate Gradient Method may be used.

In step S1110, the position and orientation calculation unit 170 determines whether termination of calculating the position and orientation is input. When the termination is input (YES in step S1110), the processing ends. When the termination is not input (NO in step S1110), the processing proceeds to step S1120.

In step S1120, the position and orientation calculation unit 170 stores in the reference image storage unit 130 a result of calculating the position and orientation and the captured image whose position and orientation is measured in the reference image storage unit 130 as the reference image. Subsequently, the processing returns to step S1020 to acquire a new image and calculate the position and orientation again.

As described above, in the first exemplary embodiment:
the image feature is extracted based on the color from the observation object captured on the captured image as needed;
at the same time, geometric information that is extracted from the three-dimensional model of the observation object and can be detected from the captured image is selected; and
the image feature based on the color of the observation object and the selected geometric information are integrated to be used for measuring the position and orientation.

Thus, according to the first exemplary embodiment, even when the feature acquired from the three-dimensional model is greatly different from the feature acquired from the captured image, or even when any change with the light source occurs while the image is being captured, the relative position and orientation between the observation object and the imaging apparatus can be stably, highly-accurately calculated.

According to the exemplary embodiment described above, in the color feature extraction processing in step S1060, the three-dimensional model data is drawn by using the position and orientation of the reference image stored in the reference image storage unit 130 to calculate the depth buffer of the observation object captured in the reference image.

However, when the position and orientation of the previous frame is used as the substantial position and orientation which is used in the geometric feature extraction processing in step S1030, the position and orientation stored in the reference image unit and the substantial position and orientation to be used in step S1030 are the same.

Therefore, in the color feature extraction processing in step S1060, the depth buffer calculated in step S1030 can be used as it is, and the three-dimensional model data does not need to be drawn. Accordingly, processing for drawing the three-dimensional model data is not necessary in the color feature extraction processing, resulting in decreasing a calculation cost.

In the exemplary embodiment described above, the color feature extraction processing and the color feature selection processing in steps S1060 and S1070 respectively may not be performed, but the position and orientation may be estimated by using only the geometric feature. In this case, the color feature extraction processing is omitted, and the position and orientation is estimated by using only the geometric information.

In other words, the position and orientation calculation unit 170 calculates the position and orientation of the imaging apparatus 100 relative to the observation object 10 by associating the geometric feature selected by the geometric feature extraction unit 140 with the image of the observation object 10 in the input image. Such a configuration can decrease the calculation cost otherwise necessary for the color feature extraction processing without losing the information used for estimating the position and orientation, when the observation object from which the feature based on the color is not detected, for example a unicolor object having no texture, is used.

Further, the color feature selection processing in step S1070 may not be performed, but all of the color feature extracted in step S1060 may be used. In this case, since the same image feature in the image of the current frame can be detected as both of the color feature and the geometric feature, the processing efficiency can be decreased.

According to the first exemplary embodiment, after the position and orientation is estimated, the captured image for each frame is stored in the reference image storage unit 130, and the captured image of the just previous frame is always used as the captured image of the past frame. On the other hand, a second exemplary embodiment of the present invention will describe a method for storing a plurality of captured images and estimating the position and orientation by using the plurality of reference images without overwriting the captured image stored in the reference image storage unit.

Figure 16:
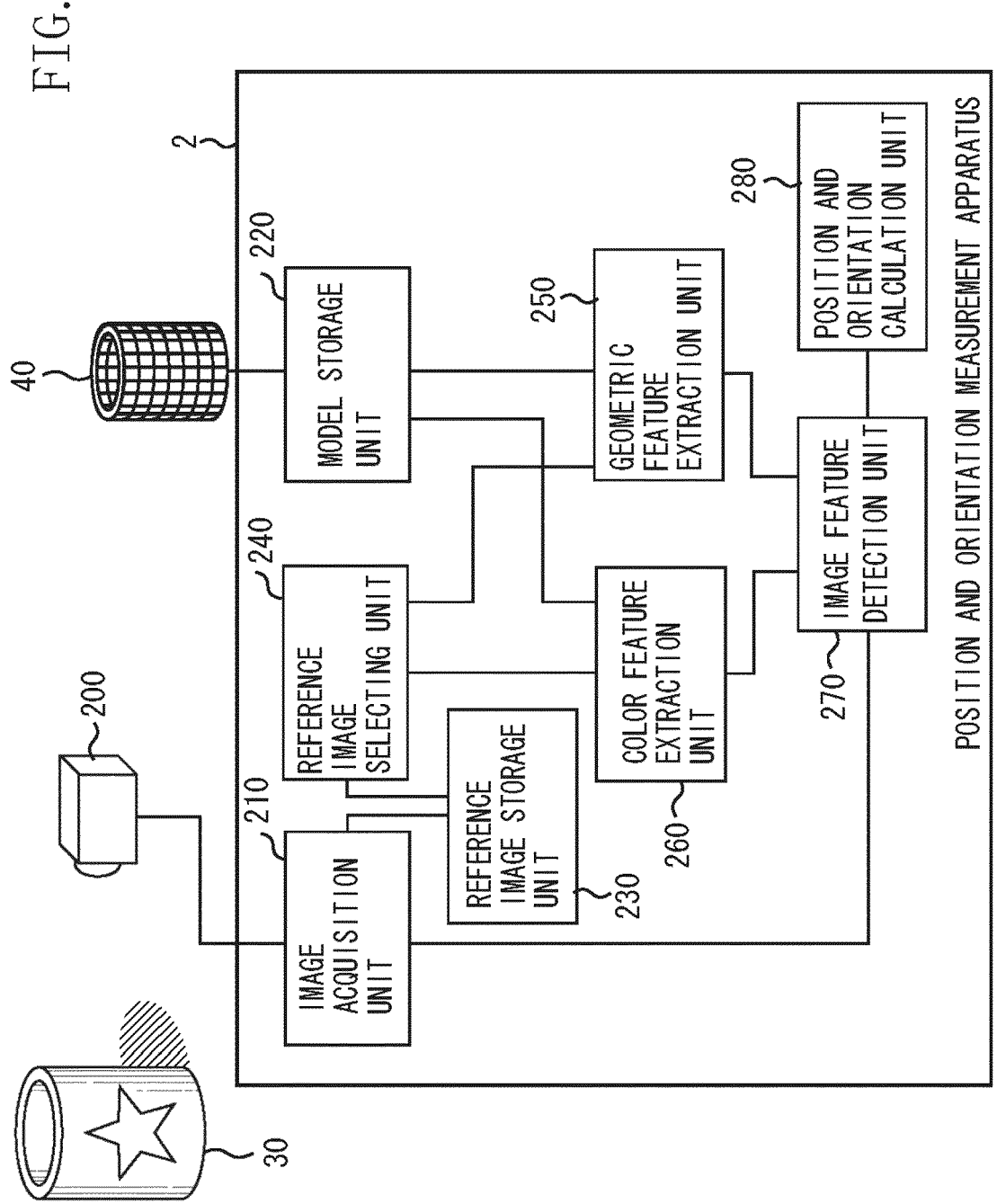
FIG. 16 illustrates a configuration of a position and orientation measurement apparatus according to a second exemplary embodiment of the present invention.

FIG. 16 illustrates a configuration of a position and orientation measurement apparatus 2 according to the second exemplary embodiment. A position and orientation measurement apparatus 2 includes an image acquisition unit 210, a model storage unit 220, a reference image storage unit 230, a reference image selection unit 240, a geometric feature extraction unit 250, a color feature extraction unit 260, an image feature detection unit 270, and a position and orientation calculation unit 280.

The image acquisition unit 210 is connected to the imaging apparatus 200. The position and orientation measurement apparatus 2 acquires the relative positions and orientations between the imaging apparatus 200 and an observation object 30 described in the three-dimensional model data 40 by using information about the captured image acquired by the imaging apparatus 200. Each unit included in the position and orientation measurement apparatus 2 will be described below.

The image acquisition unit 210, the model storage unit 220, the image feature detection unit 270, and the position and orientation calculation unit 280 perform processing similar to the image acquisition unit 110, the model storage unit 120, the image feature detection unit 160, and the position and orientation calculation unit 170 in the first exemplary embodiment.

The reference image storage unit 230 stores the captured image in which the observation object 30 is captured by the imaging apparatus 200 in the past frame and the position and orientation of the imaging apparatus relative to the observation object when being captured.

The reference image storage unit 230 also stores the color feature extracted from the captured image to be stored (the edge based on the color boundary in the present exemplary embodiment) together with the three-dimensional coordinates in the reference-coordinate system. According to the second exemplary embodiment, the captured image of the past frame which satisfies a predetermined storage condition is stored in the reference image storage unit 230. Some examples of storage conditions are that:

an accuracy for estimating the position and orientation is higher than a predetermined level;

the captured image is sufficiently away from the stored reference image, in other words, a difference between the position and orientation corresponding to the stored reference image and the position and orientation of the current frame is larger than a predetermined value; and a predetermined frame, which means a predetermined time, has elapsed since the reference image has been lastly stored.

The reference image selection unit 240 selects the reference image to be used for extracting the geometric feature from a plurality of reference images stored in the reference image storage unit 230. The second exemplary embodiment selects the reference image having the position and orientation closest to the current position and orientation set in the imaging apparatus 200.

The geometric feature extraction unit 250 extracts the geometric feature of the observation object 30 from the three-dimensional model data 40 and the substantial position and orientation of the observation object 30 stored in the model storage unit 220. Further, the geometric feature extraction unit 250 selects only the feature which can be expected to be detected form the captured image captured by the imaging apparatus 200 from among the geometric features extracted from the three-dimensional model data 40 by using the reference image selected by the reference image selection unit 240.

The color feature extraction unit 260 extracts the feature based on the color of the observation object captured into the captured image by using the captured image whose position and orientation is estimated. The color feature extraction unit 260 extracts only an edge based on the color by extracting and comparing the geometric features of the observation object observed from the position and orientation based on the estimated position and orientation and the three-dimensional model data 40 stored in the model storage unit 220.

The color feature extraction unit 260 also acquires the three-dimensional coordinates in the reference coordinates of the edge based on the color. The reference image storage unit 230 stores the acquired color feature.

Figure 17:
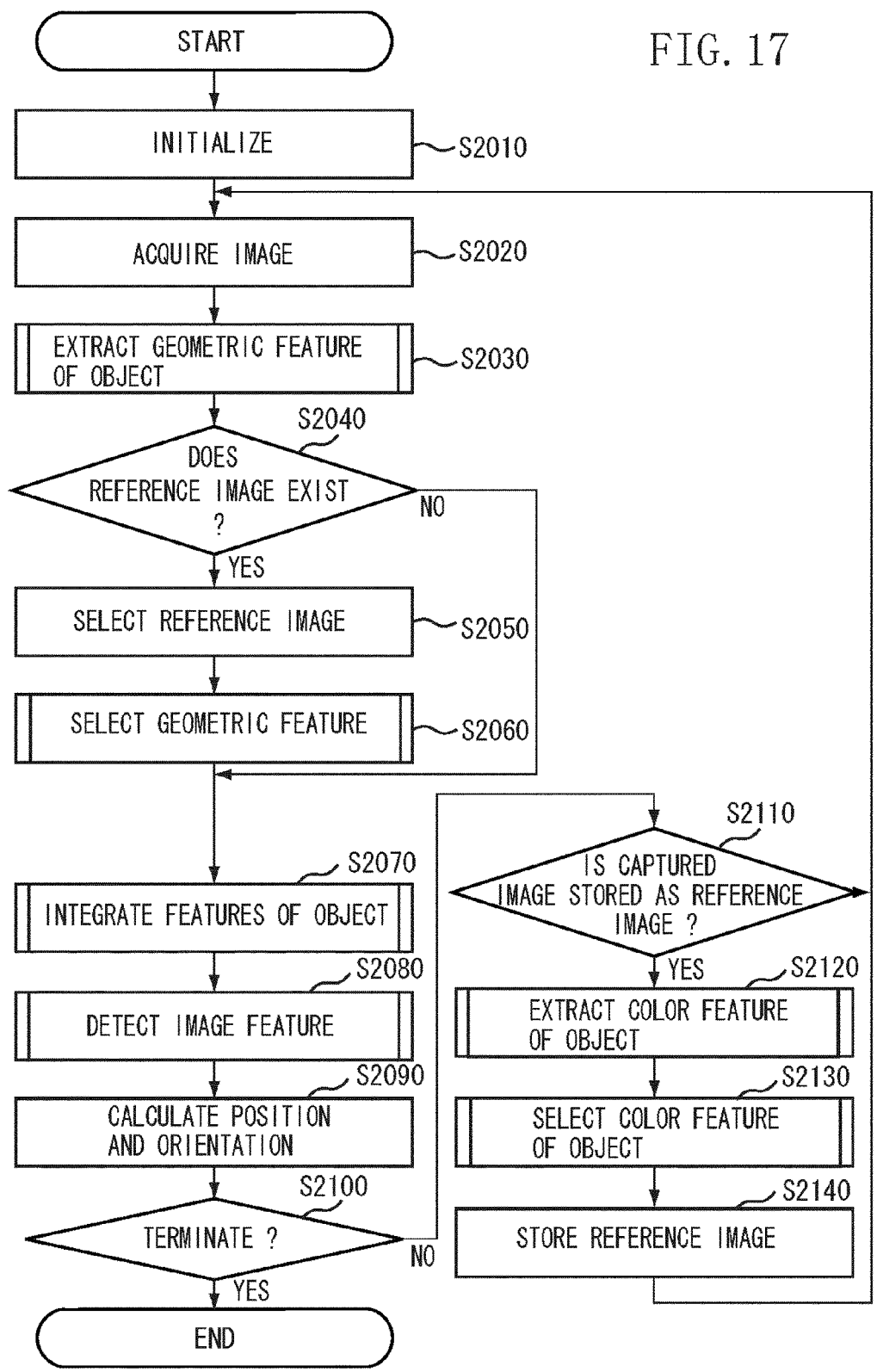
FIG. 17 is a flowchart illustrating processing of a method for measuring a position and orientation according to the second exemplary embodiment.

FIG. 17 is a flowchart illustrating processing of a method for measuring a position and orientation according to the second exemplary embodiment.

Processing performed in steps S2010, S2020, and S2030 is basically the same as that in steps S1010, S1020, and S1030 respectively in the first embodiment.

When the captured image of the past frame is stored in reference image storage unit 230 in step S2040 (YES in step S2040), the processing proceeds to step S2050. When the captured image is not stored (NO in step S2040), the processing skips the steps which follow step S2050 and in which the captured image of the past frame is used, and proceeds to step S2070.

In step S2050, the reference image selection unit 240 selects the appropriate reference image from among the plurality of reference images stored in the reference image storage unit 230. According to the present exemplary embodiment, the current position and orientation and the position and orientation of the reference image are used for selecting the reference image. The present exemplary embodiment uses the position and orientation estimated from the captured image of the just previous frame as the current position and orientation.

The reference image selection unit 240 selects the reference image which is the closest to the current position and orientation by comparing the current position and orientation with the position and orientation of each reference image stored in the reference image storage unit 230. The reference image selected in step S2050 is used as the reference image for subsequent steps.

In step S2060, the geometric feature extraction unit 250 selects the geometric feature extracted in step S2030. Processing in step S2060 is basically the same as that in step S1050 in the first exemplary embodiment. However, step S2060 is different from step S1050 in that step S2060 uses the reference image selected in step S2050 as the reference image.

In step S2070, the image feature detection unit 270 generates the object feature model in which the geometric feature model and the color feature model are integrated by using the color feature model corresponding to the reference image selected in step S2050.

The processing in step S2070 is basically the same as that in step S1080 in the first exemplary embodiment. Step S2070 is different from step S1080 in that step S2070 uses the color feature model corresponding to the reference image selected in step S2050. The color feature model corresponding to the selected reference image is generated in step S2130 which is one of processes for storing the reference image and stored in the reference image storage unit 230.

Processing performed in steps S2080, S2090, and S2100 is basically the same as that in steps S1090, S1100, and S1110 respectively in the first exemplary embodiment.

In step S2110, the reference image storage unit 230 determines whether to store the captured image whose position and orientation is estimated as the reference image. When the captured image is to be stored (YES in step S2110), the processing proceeds to step S2120. When the captured image is not to be stored (NO in step S2110), the processing returns to step S2020 and acquires a new image to calculate the position and orientation as described above.

In this example of the second exemplary embodiment, the condition for storing the captured image as the reference image is that the captured image to be stored is a predetermined distance away from the position and orientation of the reference image stored in the reference image storage unit 230 and a predetermined frame has lapsed since a reference frame has been lastly stored.

In step S2120, the color feature extraction unit 260 detects the feature based on the color information about the observation object from the captured image determined to be stored in step S2110 and generates the color feature model by using the position and orientation estimated in step S2090. A method for generating the color feature model is basically the same as that in step S1060 in the first exemplary embodiment.

Processing in step S2130 is basically the same as that in step S1070 in the first exemplary embodiment.

In step S2140, the reference image storage unit 230 stores the positions and the orientations of the color feature model generated in step S2120 and the observation object calculated in step S2090, and the captured image from which the position and orientation is calculated. Subsequently, the processing returns to step S2020 and acquires a new image to calculate the position and orientation again.

As described above, according to the second exemplary embodiment, the plurality of reference images having different positions and orientations are held, and thus the captured image does not need to be stored for each frame as the reference image. Further, the color feature model extracted from the reference image is held in the reference image storage unit 230, and thus the color feature does not need to be calculated for every frame.

Furthermore, from among the plurality of reference images, the reference image having the closest position and orientation to the current position and orientation of the observation object and the color feature model thereof is used, and the position and orientation can be estimated by integrating and using the geometric feature and color feature, while suppressing the calculation cost.

According to the exemplary embodiment as described above, the captured image to be stored as the reference image is stored without any conditions when the predetermined frame has elapsed since the captured image has been lastly stored and also the position and orientation of the stored captured image is a predetermined distance away from the current position and orientation. However, when the accuracy for estimating the stored position and orientation is low, the color feature model may be generated from the reference image having the low accuracy for estimating the position and orientation.

Therefore, the accuracy for estimating the position and orientation is decreased by using the inaccurate feature model. Addressing the problem, when the captured image is stored as the reference image, a restriction is added in which the accuracy for estimating the position and orientation is also calculated and the captured image can be stored as the reference image only when the estimation accuracy is higher than a predetermined level.

With this restriction, even when the position and orientation cannot be estimated stably, since the position and orientation has the higher accuracy of the estimation than the predetermined level and only the captured image captured with the higher accuracy is stored as the reference image, the position and orientation can be stably estimated. As a method for calculating the estimation accuracy, for example, a method for detecting a failure of the estimation of the position and orientation as discussed in Literature 6 may be employed.

According to the second exemplary embodiment, the captured image once stored as the reference image is kept stored while the position and orientation measurement apparatus is being operated. However, a case may occur in which the color of the observation object changes due to a change of the environment of the light source while the image is being captured.

In step S2140, thus, when the captured image is stored as the reference image, time information may be added so that the reference image can be deleted after a predetermined time elapses. In other words, the old image features are discriminated in time series from older to newer, and the image features may be updated in time series from older to newer as needed.

This processing updates the reference images in time series from older to newer, and thus it is possible to flexibly deal with the change of the environment for capturing image. Further, not simply the reference image is deleted after the predetermined time elapses, but a flag for overwriting the reference image which has passed the predetermined time is kept ON and the reference image with the overwriting flag kept ON may be overwritten when the captured image is stored as the reference image.

Furthermore, when the captured image is stored as the reference image, the position and orientation of the captured image to be stored is compared with that of the reference image with the overwriting flag ON. If the position and orientation of the captured image is to be found to be close enough to that of the reference image, the captured image may be overwritten onto the reference image.

Processing described above can prevent a useful reference image from being deleted when the position and orientation is not changed for a certain time. Moreover, a number of captured images to be held as the reference images may be set to a predetermined number, and the reference image holding the oldest time information may be overwritten.

According to the exemplary embodiment described above, the processing for storing the captured image as the reference image is performed after the position and orientation is calculated and whether to store the reference image is determined in step S2110. However, the storage processing may be performed non-synchronously. The processing for storing the reference image and extracting the color feature, which are the processing in steps S2120, S2130, and S2140, are performed separately.

If the processing is performed separately, the position and orientation can be independently calculated and the reference image can be independently stored. Even while the reference image is being stored, effects on a frame rate for estimating the position and orientation can be decreased.

Further, any processing which may benefit from the calculation cost can be adopted into the processing for extracting the features from the reference image. For example, in the processing for extracting the color feature from the reference image, if the correspondence between the images is calculated from the color feature extracted from the plurality of reference images and the color feature only from the reference image is reconstructed into the three dimension, the position and orientation can be estimated by using a feature which cannot be acquired from the three-dimensional model of the object.

According to the exemplary embodiment as described above, only one reference image is selected from among the plurality of reference images stored in the reference image storage unit 230 to be used for discrimination of the color feature model or geometric feature. However, there is information about an appearance that changes depending on a surface attribute of the observation object and the viewing location due to, for example, mirror reflection.

If the feature which changes depending on the viewing location is extracted as the color feature model, the position and orientation cannot be stably estimated by using the color feature model. When occlusion occurs to the observation object, a similar problem arises.

Addressing the problem, in step S2050, the plurality of reference images which are close to the current position and orientation may be selected and the plurality of color feature model may be compared to use the color feature which is stably detected from among the plurality of reference images. The "stably detected color feature" is, for example, the color feature which can be detected from the plurality of (two or more) reference images.

This processing can estimate the position and orientation while eliminating the effects by a false color feature due to the mirror reflection or occlusion. Further, in step S2060, the geometric feature selection processing is performed on the plurality of reference images to determine whether the geometric feature can be detected therefrom. Thus, the geometric feature which can be stably detected can be used.

The "geometric feature which can be stably detected" means, for example, the geometric feature which has a corresponding color feature that can be detected from the plurality of reference images. This processing can stably estimate the position and orientation even when the mirror reflection or the occlusion occurs.

According to the first and second exemplary embodiments, after the position and orientation is estimated, a frame image of the captured image is stored as the reference image in the reference image storage units 130 and 240, and the feature based on the color of the observation object is extracted from the reference image. On the other hand, a third exemplary embodiment of the present invention describes a method for estimating information of a surface color of the three-dimensional model from the captured image, extracting the feature based on the color of the observation object from the drawn image acquired as a result of drawing the three-dimensional model, and estimating the position and orientation.

Figure 18:
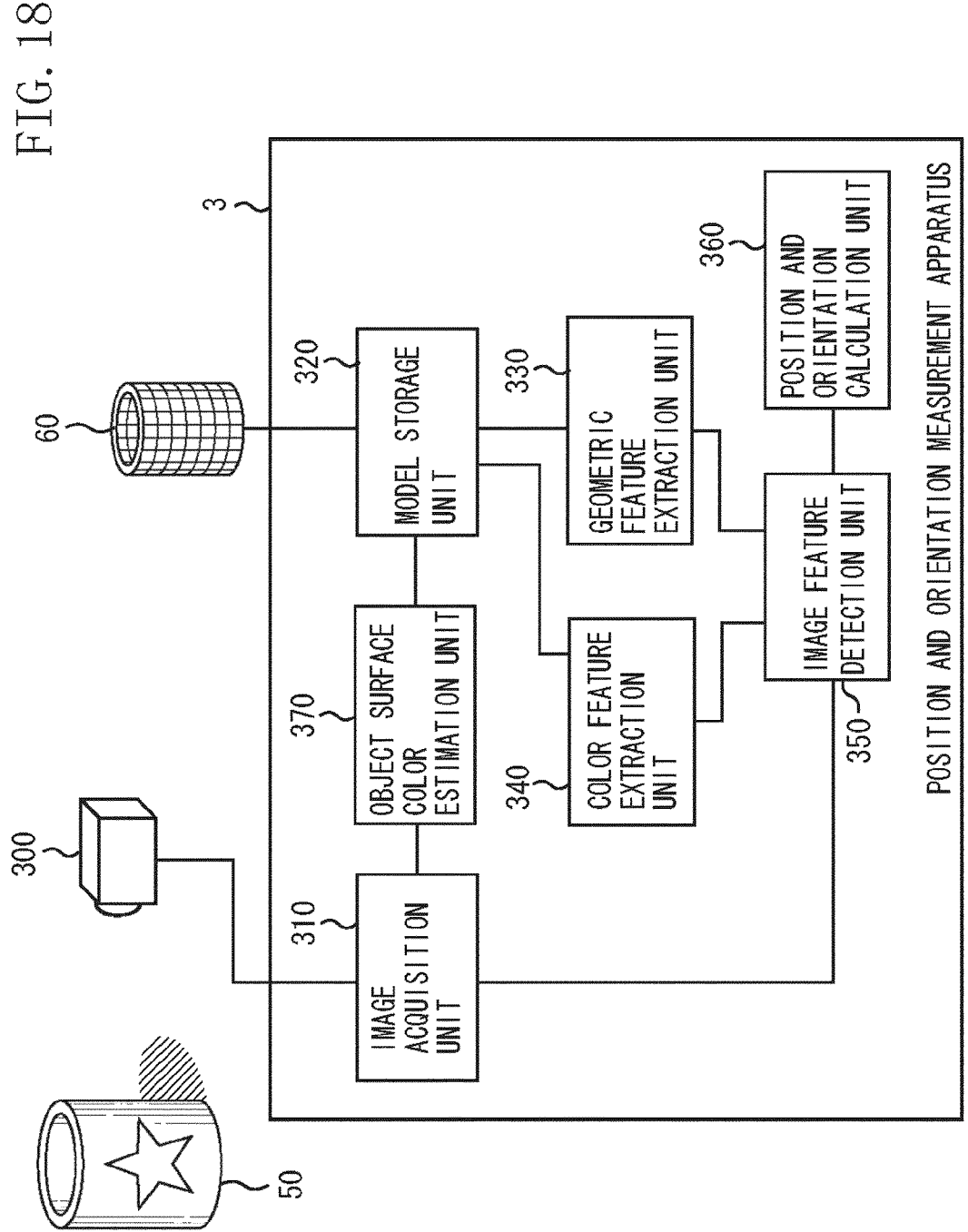
FIG. 18 illustrates a configuration of a position and orientation measurement apparatus according to a third exemplary embodiment of the present invention.

FIG. 18 illustrates a configuration of a position and orientation measurement apparatus 3 according to the third exemplary embodiment. The position and orientation measurement apparatus 3 includes an image acquisition unit 310, a model storage unit 320, a geometric feature extraction unit 330, a color feature extraction unit 340, an image feature detection unit 350, a position and orientation calculation unit 360, and an object surface color estimation unit 370.

The image acquisition unit 310 is connected to the imaging apparatus 300, which captures an observation object 50. The position and orientation measurement apparatus 3 acquires the position and orientation of the imaging apparatus 300 relative to the observation object described in the three-dimensional model data 60 by using information about the captured image.

A condition for applying the position and orientation measurement apparatus 3 in the third exemplary embodiment is that the observation object is included in the captured image of a scenery which is captured by the imaging apparatus 300. Each unit included in the position and orientation measurement apparatus 3 will be described below.

The image acquisition unit 310, the image feature detection unit 350, and the position and orientation calculation unit 360 perform processing similar to the image acquisition unit 110, the image feature detection unit 160, and the position and orientation calculation unit 170 in the first exemplary embodiment.

The model storage unit 320 stores the three-dimensional model data 60 of the observation object 50, which is a reference for measuring the position and orientation. The three-dimensional model data 60 has three-dimensional geometric information which represents a surface shape of the observation object 50 and the color information of the object surface. The three-dimensional model data 60 is defined by a texture image which represents the vertex information, the information about the face formed by connecting each vertex, and the color information of the surface.

According to the third exemplary embodiment, the polygonal model including the vertex information and the information about the face formed by connecting each vertex is used as the three-dimensional model data 60. Further, the three-dimensional model data 60 also holds the information about the surface color of the observation object as the texture image.

A relative positional relationship between the two-dimensional coordinates on the texture image and the vertex in the three-dimensional model is previously acquired as a texture conversion matrix. The surface color of the observation object is not known in a very first frame from the texture image, since the texture image is estimated on line from the captured image by the object surface color estimation unit 370, that is, at the execution point. Thus, the texture image is previously initialized with a predetermined color.

The geometric feature extraction unit 330 draws the three-dimensional model data from the substantial position and orientation and the three-dimensional model data 60 of the observation object 50 stored in the model storage unit 320, and stores the luminance value and the depth value of the three-dimensional model data on the flat surface of the image acquired as a drawing result. The geometric feature extraction unit 330 extracts the feature based on the geometric information of the observation object 50 from the depth value.

The color feature extraction unit 340 extracts the feature, which is the edge, based on the color of the observation object from the luminance value of the three-dimensional model data 60 on the flat surface of the image and also acquires the three-dimensional coordinates in the reference coordinate of the feature, which is the edge, based on the color.

The object surface color estimation unit 370 estimates the surface color of the observation object 50 by using the captured image whose position and orientation is estimated. According to the present exemplary embodiment, the luminance value of the observation object 50 captured on the captured image is mapped on the texture image to estimate the surface color of the observation object.

Figure 19:
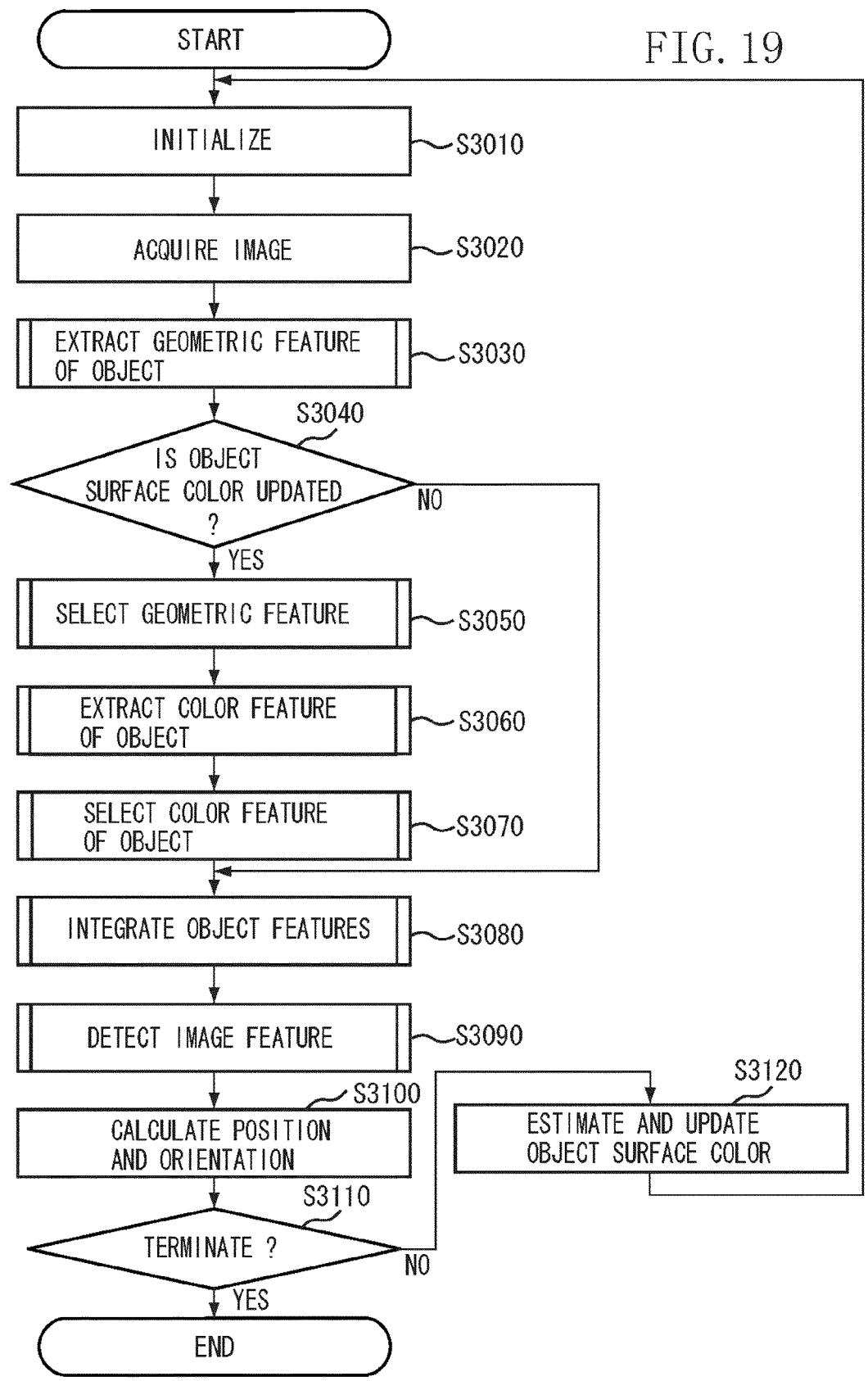
FIG. 19 is a flowchart illustrating processing of a method for measuring a position and orientation according to the third exemplary embodiment.

FIG. 19 is a flowchart illustrating processing of a method for measuring the position and orientation according to the third exemplary embodiment.

Processing in steps S3010 and S3020 is similar to that in steps S1010 and S1020 in to the first exemplary embodiment.

In step S3030, the geometric feature extraction unit 330 draws the observation object 50 by using the three-dimensional model data 60 and detects the feature based on the geometric information. Processing in step S3030 is basically the same as that in step S1010 in the first exemplary embodiment. Step S3030 is different from step S1010 in that step S3030 maps the texture by the texture image held in the model storage unit 320 when the three-dimensional model is drawn and the drawing result is stored as a color buffer.

By drawing the three-dimensional model whose surface color is estimated, the drawing result of the three-dimensional model which has a similar appearance to that of the observation object to be captured into the actual captured image can be acquired. The luminance value of the three-dimensional model data on the flat surface of the image acquired as the drawing result is stored as the color buffer and used for the subsequent processing.

In step S3040, when the texture image held in the model storage unit 320 is updated (YES in step S3040), the processing proceeds to step S3050. When the texture image is not updated, for example, since the texture image is in the very first frame (NO in step S3040), the processing skips steps S3050, S3060, and S3070 and proceeds to step S3090.

In step S3050, the geometric feature extraction unit 330 selects the geometric feature extracted in step S3030. Processing in step S3050 is basically the same as that in step S1050 in the first exemplary embodiment. Step S3050 is different from step S1050 in that step S3050 uses the color buffer stored in step S3030 instead of the reference image.

In step S3060, the color feature extraction unit 340 detects the feature based on the color information about the observation object from the color buffer stored in step S3030 and generates the color feature model. A method for generating the color feature model is basically the same as that in step S1060 in the first exemplary embodiment.

Step S3060 is different from step S1060 in that step S3060 uses the color buffer stored in step S3030 instead of the reference image. For the position and orientation to be used for back projection of the color image, the same position and orientation as that used for drawing the three-dimensional model data in step S3030 is used.

In step S3070, the color feature extraction unit 340 selects the color feature model extracted in step S3060. Processing in step S3070 is basically the same as that in step S1070 in the first exemplary embodiment.

Step S3070 is different from step S1060 in that step S3070 uses the color buffer stored in step S3030 instead of the reference image. For the position and orientation to be used for back projection of the color image, the same position and orientation as that used for drawing the three-dimensional model data in step S3030 is used.

Processing of steps S3080, S3090, and S3100 is basically the same as that in steps S1080, S1090, and S1100 in the first exemplary embodiment.

In step S3110, the position and orientation measurement apparatus 3 determines whether the termination of calculating the position and orientation is input. When the termination of calculating the position and orientation is input (YES in step S3110), the processing ends. When the termination of calculating the position and orientation is not input (NO in step S3110), the processing proceeds to step S3120.

In step S3120, the object surface color estimation unit 370 estimates the surface color of the observation object from the captured image whose position and orientation is estimated. The object surface color estimation unit 370 acquires the three-dimensional coordinates in the reference-coordinate system corresponding to the two-dimensional coordinates on the captured image by the same procedure and processing as those for acquiring the three-dimensional coordinates of the edge element in the reference-coordinate system in step S3030.

Next, the two-dimensional coordinates on the texture image corresponding to the acquired three-dimensional coordinate image is acquired by using the texture conversion matrix stored in the model storage unit 320. According to the procedure described above, a relationship between the two-dimensional coordinates on the capture image and the two-dimensional coordinates on the texture image is acquired, and the luminance value of the observation object captured on the captured image is mapped on the texture image to update the texture image and estimate the surface color of the observation object.

At this point, the luminance value on the captured image is not set as the luminance value on the texture image as it is, and the luminance value of the texture image is updated gradually depending on a learning coefficient. This processing can decrease an effect when the captured image having a low estimation accuracy of the position and orientation is captured or when the occlusion occurs, and updates only the surface color having a high possibility.

As the learning coefficient, an appropriated value is set depending on accuracy for estimating the position and orientation and how rapidly the surface color changes. The surface color is updated by the above-described processing, the processing returns to step S3020 and acquires a new image to calculate the position and orientation again.

As described above, according to the third exemplary embodiment, the texture image of each frame is updated from the captured image from which the position and orientation is estimated, and the surface color of the observation object is directly estimated. By this processing, the captured image does not need to be stored as the reference image. As described above, according to the third exemplary embodiment, the three-dimensional model data in which the surface color of the observation object is estimated is drawn, and the feature based on the color of the observation object is extracted from the result of the drawn image which has a similar appearance to that of the observation object.

According to the above-described exemplary embodiments, the edge is used as the feature based on the color extracted from the reference image. However, the feature is not limited to the edge. For example, a Harris detector, or a point feature detected by a SIFT detector described in "I. Skrypnyk and D. G. Lowe, Scene modeling, recognition and tracking with invariant image features, Proc. The 3rd IEEE/ACM International Symposium on Mixed and Augmented Reality (ISMAR04), pp. 110-119, 2004" may be used.

At this point, as a descriptor for the point feature, a luminous distribution of a periphery of the point feature, or alternatively an SIFT descriptor described in the above-described Literature may be used. A detector of the feature point and the descriptor has no specific limitations to be selected.

When the point feature is used as a feature based on the color, the image coordinates on the image on which the three-dimensional point in the reference coordinate system and the point feature are detected from the observation object captured in the reference image and a pointer of the image are stored as the color feature model. The point feature in the color feature model is associated with the point feature detected from the captured image of the current frame to estimate the position and orientation.

The point feature can be easily detected from an object on which the erroneous correspondence frequently occurs when the edge is used as the feature on the object having a fine design. Therefore, when the object has the fine design, it is desired to use the stable estimation of the position and orientation rather than the edge as the feature.

Aspects of the present invention can also be realized by a computer of a system or apparatus (or devices such as a CPU or a micro-processing unit (MPU)) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). The program includes computer executable instructions for implementing the present invention. For this purpose, the program is provided to the computer, for example, via a network or from a recording medium of various types serving as the memory device (e.g., computer-readable storage medium).

An operating system (OS) or other application software running on a computer can execute part or all of actual processing based on instructions of the program to realize the functions one or more of the above-described exemplary embodiments.

Additionally, the program read out of a storage medium can be written into a memory of a function expansion card inserted in a computer or into a memory of a function expansion unit connected to the computer. In this case, based on instructions of the program, a CPU or MPU provided on the function expansion card or the function expansion unit can execute part or all of the processing to realize the functions of one or more of the above-described exemplary embodiments.

A wide variety of storage media may be used to store the program. The storage medium may be, for example, any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-244945 filed Sep. 24, 2008, which is hereby incorporated by reference herein in its entirety.

What is claimed is:

1. A position and orientation measurement apparatus comprising:
   an input unit configured to input an image captured by an imaging apparatus;
   a storage unit configured to store three-dimensional model data which represents a surface shape of an observation object;
   a geometric feature extraction unit configured to extract a plurality of geometric features based on geometric information about the observation object by drawing the three-dimensional model data;
   a reference image storage unit configured to store at least one reference image in which a position and orientation of the imaging apparatus relative to the observation object is known;
   a geometric feature selection unit configured to select from the plurality of geometric features a geometric feature that corresponds to an image feature in the reference image; and
   a calculation unit configured to calculate the position and orientation of the imaging apparatus relative to the observation object by associating the geometric feature selected by the geometric feature selection unit with an image of the observation object in the image input by the input unit.

2. The position and orientation measurement apparatus according to claim 1, further comprising:
   an image feature extraction unit configured to extract from the image input by the input unit a plurality of image features related to the observation object based on a brightness or a color from the reference image;
   an integration unit configured to integrate at least one image feature extracted by the image feature extraction unit and the geometric feature selected by the geometric feature selection unit as an object feature, wherein the calculation unit calculates the position and orientation of the imaging apparatus relative to the observation object by associating the object feature with the image of the observation object in the image input by the input unit.

3. The position and orientation measurement apparatus according to claim 2, further comprising an image feature selection unit configured to search for a geometric feature corresponding to said plurality of image features by drawing the three-dimensional model data on a flat surface of the image at the position and orientation of the reference image and to acquire an image feature selected by eliminating the image feature whose corresponding geometric feature is detected, wherein the integration unit integrates the image feature selected by the image feature selection unit and the geometric feature selected by the geometric feature selection unit as the object feature.

4. The position and orientation measurement apparatus according to claim 1, wherein the reference image storage unit is configured to store, as one of said at least one reference image, the image input by the input unit together with the position and orientation calculated by the calculation unit.

5. The position and orientation measurement apparatus according to claim 1, wherein the geometric feature extraction unit extracts an edge based on a depth value obtained by drawing the three-dimensional model data on a flat surface of an image as a geometric feature.

6. The position and orientation measurement apparatus according to claim 2, wherein the image feature extraction unit extracts, as an image feature, an edge based on a boundary of a color or a brightness from the reference image.

7. The position and orientation measurement apparatus according to claim 4, further comprising an estimation accuracy calculation unit configured to calculate an accuracy for estimating the position and orientation calculated by the calculation unit, wherein the reference image storage unit stores the image input by the input unit as one of said at least one reference image only when the estimation accuracy exceeds a predetermined value.

8. The position and orientation measurement apparatus according to claim 4, wherein the geometric feature selection unit selects and uses, from said at least one reference image, a reference image which has a position and orientation closest to a current position and orientation calculated by the calculation unit.

9. The position and orientation measurement apparatus according to claim 8, wherein the reference image storage unit adds time information to the image input by the input unit and stores the image as one of said at least one reference image, and updates said at least one reference image in order from older to newer in time series.

10. The position and orientation measurement apparatus according to claim 4, wherein the geometric feature selection unit selects only an image feature which can be detected from said at least one reference image.

11. The position and orientation measurement apparatus according to claim 1, wherein the three-dimensional model data includes information about texture, wherein the position and orientation measurement apparatus further comprises a drawing unit configured to draw the three-dimensional model data together with the texture on a flat surface of the image using a calculated just previous position and orientation of the imaging apparatus, and wherein the reference image is drawn by the drawing unit.

12. A position and orientation measurement method comprising:

inputting an image captured by an imaging apparatus;

reading out three-dimensional model data which represents a surface shape of an observation object from a memory;

extracting a plurality of geometric feature based on geometric information about the observation object by drawing the three-dimensional model data;

storing a at least one reference image in which a position and orientation of the imaging apparatus relative to the observation object is known;

selecting from the plurality of geometric features a geometric feature that corresponds to an image feature in the reference image; and calculating the position and orientation of the imaging apparatus relative to the observation object by associating the selected geometric feature with an image of the observation object in the input image.

13. A non-transitory computer-readable storage medium storing a program of computer executable instructions for causing a computer to perform the position and orientation measurement method according to claim 12.

14. A position and orientation measurement apparatus comprising:

an input unit configured to input an image captured by an imaging apparatus;

a storage unit configured to store three-dimensional model data which represents a surface shape of an observation object;

a geometric feature extraction unit configured to extract a plurality of geometric features using the three-dimensional model data;

a reference image storage unit configured to store at least one reference image in which a position and orientation of the imaging apparatus relative to the observation object is known;

a determination unit configured to determine the geometric features to be associated, based on the plurality of geometric features extracted by the geometric feature extraction unit and the reference image; and a calculation unit configured to calculate the position and orientation of the imaging apparatus relative to the observation object by associating the geometric feature determined by the determination unit with an image of the observation object in the image input by the input unit.

* * * * *